United States Patent
Xiao et al.

(10) Patent No.: US 12,420,527 B2
(45) Date of Patent: Sep. 23, 2025

(54) BENDABLE ELEMENT

(71) Applicant: SCHOTT GLASS TECHNOLOGIES (SUZHOU) CO. LTD., Jiangsu (CN)

(72) Inventors: Wei Xiao, Suzhou (CN); Ning Da, Suzhou (CN); Feng He, Suzhou New District (CN)

(73) Assignee: SCHOTT GLASS TECHNOLOGIES (SUZHOU) CO. LTD., Jiangsu (CN)

( * ) Notice: Subject to any disclaimer, the term of this patent is extended or adjusted under 35 U.S.C. 154(b) by 710 days.

(21) Appl. No.: 17/408,153

(22) Filed: Aug. 20, 2021

(65) Prior Publication Data

US 2022/0055348 A1   Feb. 24, 2022

(30) Foreign Application Priority Data

Aug. 21, 2020   (WO) ................ PCT/CN2020/110428

(51) Int. Cl.
*B32B 17/10*   (2006.01)
*C03C 3/083*   (2006.01)
(Continued)

(52) U.S. Cl.
CPC .... *B32B 17/10018* (2013.01); *B32B 17/1055* (2013.01); *C03C 3/083* (2013.01);
(Continued)

(58) Field of Classification Search
None
See application file for complete search history.

(56) References Cited

U.S. PATENT DOCUMENTS 6,815,070 B1 * 11/2004 Burkle ............... B32B 17/10
427/166
2015/0210588 A1   7/2015 Cimo et al.
(Continued)

FOREIGN PATENT DOCUMENTS

| AU | 2015355047 | 3/2018 |
| CN | 106061913 | 10/2016 |

(Continued)

OTHER PUBLICATIONS

International Search Report dated Apr. 25, 2021 in corresponding PCT International Patent Application No. PCT/CN2020/110428, 7pgs.
(Continued)

*Primary Examiner* — Ramsey Zacharia
(74) *Attorney, Agent, or Firm* — Ruggiero McAllister & McMahon LLC

(57) ABSTRACT

The present disclosure relates to bendable elements. The bendable elements can be used in display covers for electronic devices such as smart phones. The elements have reduced delayed elastic deformation or creep when released from the influence of persistent mechanical stresses, e.g. unfolded from a folded position. The present disclosure also relates to covers for color filters, filter printed electronics, sensors for touch control panels, fingerprint sensors, mobile electronic devices, bendable/foldable displays that include the bendable elements as substrates, or other applications where a combination of high chemical stability, temperature stability, low gas permeability, flexibility, high strength, low thickness and premium cosmetic appearance is necessary. Besides consumer and industrial electronics the present disclosure could also be used for protection applications in industrial production or metrology.

20 Claims, 10 Drawing Sheets

(51) Int. Cl.
  *G06F 1/16*    (2006.01)
  *G09F 9/30*    (2006.01)
  *H04M 1/02*    (2006.01)

(52) U.S. Cl.
  CPC ............ *G06F 1/1652* (2013.01); *G09F 9/301* (2013.01); *H04M 1/0268* (2013.01); *B32B 2255/26* (2013.01); *B32B 2307/536* (2013.01); *B32B 2307/542* (2013.01); *B32B 2307/546* (2013.01); *B32B 2307/558* (2013.01); *B32B 2307/732* (2013.01); *B32B 2367/00* (2013.01); *B32B 2379/08* (2013.01); *B32B 2457/20* (2013.01)

(56) References Cited

U.S. PATENT DOCUMENTS

| | | |
|---|---|---|
| 2017/0096364 A1 * | 4/2017 | Ottermann ............ B65H 75/08 |
| 2017/0274627 A1 | 9/2017 | Chang et al. |
| 2017/0303414 A1 * | 10/2017 | Chu ..................... H05K 5/0226 |
| 2017/0338182 A1 | 11/2017 | Gross |
| 2018/0009197 A1 | 1/2018 | Gross et al. |
| 2019/0011954 A1 | 1/2019 | Chu |
| 2019/0047900 A1 | 2/2019 | Hu |
| 2019/0062203 A1 * | 2/2019 | Gross ..................... G06F 1/1637 |
| 2019/0315099 A1 | 10/2019 | Baby |
| 2020/0199013 A1 | 6/2020 | Da et al. |
| 2020/0262746 A1 | 8/2020 | He |
| 2021/0380474 A1 * | 12/2021 | Brandenburg .......... C03C 17/32 |

FOREIGN PATENT DOCUMENTS

| | | | |
|---|---|---|---|
| CN | 106660316 | 5/2017 | |
| CN | 107003789 | 8/2017 | |
| CN | 107108343 | 8/2017 | |
| CN | 107207327 | 9/2017 | |
| CN | 108463339 | 8/2018 | |
| CN | 108779018 | 11/2018 | |
| CN | 110139751 | 8/2019 | |
| CN | 110570768 | 12/2019 | |
| CN | 111094199 | 5/2020 | |
| KR | 101238214 | 3/2013 | |
| WO | WO-0066507 A1 * | 11/2000 | ............ B32B 17/10 |
| WO | 2015011649 | 1/2015 | |
| WO | 2015116465 | 8/2015 | |
| WO | 2017123899 | 7/2017 | |
| WO | 2019085422 | 5/2019 | |
| WO | WO-2019089518 A1 * | 5/2019 | ............ B65H 20/02 |

OTHER PUBLICATIONS

Written Opinion dated Apr. 25, 2021 in corresponding PCT International Patent Application No. PCT/CN2020/110428, 5 pgs.
Geng, "Engineering Materials", China National Intellectual Property Administration, 2002, Tianjin, Tianjin University Press, with English translation, 4 pages.
Sha, "Mechanical Properties of Materials", Beijing, Beijing University of Technology Press, 2015, with English translation, 8 pages.

* cited by examiner

BENDABLE ELEMENT

CROSS-REFERENCE TO RELATED APPLICATION

The present application claims priority under 35 U.S.C. § 119 to International Patent Application No. PCT/CN2020/110428, filed on Aug. 21, 2020, which is herein incorporated by reference.

BACKGROUND OF THE DISCLOSURE

1. Field of the Disclosure

The disclosure relates to bendable elements. The bendable elements can be used in display covers for electronic devices such as smart phones.

The present disclosure relates to a foldable element having reduced delayed elastic deformation or creep when released from the influence of persistent mechanical stresses, e.g. unfolded from a folded position. The disclosure is also related to use of bendable elements as substrates or covers for color filters, filter printed electronics, sensors for touch control panels, fingerprint sensors, mobile electronic devices, bendable/foldable displays, or other applications where a combination of attributes, such as high chemical stability, temperature stability, low gas permeability, flexibility, high strength, low thickness and premium cosmetic appearance is necessary. Besides consumer and industrial electronics, the disclosure could also be used for protection applications in industrial production or metrology.

2. Discussion of the Related Art

Bendable and/or foldable electronic devices are gaining more and more attention in the smart phone industry. Many attempts have been made to introduce bendable and/or foldable smart phones to the market. One of the major obstacles that must be overcome by the manufacturers is the combination of sufficient bendability and mechanical resistance such as resistance to impact.

As the mechanical properties and performance of bendable elements for foldable/flexible display are very demanding because of the continuous folding and unfolding processes, most prior art documents were dealing with the mechanical evaluations of the cover material. Creases/waviness of the display due to deformation of the cover caused by mechanical stresses due to folding/unfolding processes were not in the focus.

Recently, reports were published that the foldable devices on the market show imperfections in the bending region after bending, e.g. creases or delaminations on the display. Thus, it is not sufficient that a cover element for a foldable device provides very small bending radii and mechanical stability at the same time.

It is an object of this disclosure to overcome the shortcomings of the prior art.

SUMMARY OF THE DISCLOSURE

In an aspect, the disclosure relates to a bendable element having a thickness, a length and a width, and having a first and a second primary surface, wherein the element can be bent to a bending radius of 5.0 mm without failure. Also, the element has reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity.

In another aspect, the disclosure relates to an electronic device having a foldable display comprising a bendable element as described herein, and at least one hinge allowing the display to be bent about a bending axis. The electronic device is designed such that the display can be bent to a bending radius of no less than the 40 mm-initial deformation threshold of the bendable element.

The bendable element of this disclosure may be a part of a display of an electronic device, such as a cover element. In this context, the bendable element may be disposed on a polarizer layer. The bendable element may be attached to a polarizer layer by an adhesive layer, such as an OCA layer.

In another aspect, the disclosure relates to a bendable element having a thickness, a length and a width, and having a first and a second primary surface, wherein the element can be bent to a bending radius of 10.0 mm, 8.0 mm or 4.0 mm without failure. The element has reduced persistent deformation characterized by a total persistent deformation $a_0$ of not more than 3.0 mm and a deformation recovery time $b_1$ of less than 10 hours after bending the element to a bending radius of 15.0 mm, 10.0 mm, 8.0 mm or 4.0 mm for 24 hours at 25° C. and 30% relative humidity.

In another aspect, the disclosure relates to a bendable element having an initial deformation distance Do at a 10.0 mm bend radius of not more than 40 mm, wherein the initial deformation distance is the height of the deformation distance measured immediately after releasing the bendable element from the 10.0 mm bend radius after 24 hours in a bent state at 25° C. and 30% relative humidity.

In another aspect, the bendable element can have a 40 mm-initial deformation threshold of less than 10.0 mm, wherein the 40 mm-initial deformation threshold indicates the bending radius to which the bendable element can be bent for 24 hours at 25° C. and 30% relative humidity without exceeding an initial deformation distance of 40 mm immediately after releasing the bendable element from the bend radius.

In an aspect, the disclosure relates to a bendable element, with the bendable element comprises a glass layer having a thickness of 70.0 µm or less, two polymer layers disposed on opposing sides of the glass layer having thicknesses of 70.0 µm or less each, and two adhesive layers disposed on opposing sides of the glass layer between glass layer and polymer layers, wherein the cumulative thickness of the glass layer, the two polymer layers and the two adhesive layers is 250.0 µm or less. The polymer layers may comprise or consist of one or more polymers having a creep resistance of at least 0.70.

It was found that the bendable elements of this disclosure show reduced crease and delamination. The total persistent deformation $a_0$ may be up to 5.0 mm, up to 4.0 mm, up to 3.0 mm. In embodiments, the total persistent deformation can even be 2.0 mm or less, or 1.5 mm or less. For some embodiments, the total persistent deformation can be 1.0 mm or less, or even 0.7 mm or less. Optionally, the total persistent deformation is at least 0.01 mm. For the purposes of this description, the total persistent deformation can be assumed to be reached 120 hours after release from the bent state.

A low persistent deformation means that most of the initial deformation of the bendable element relaxes with time. The material of the bendable element assumes its original shape again after stress is released. For a smartphone display, this means that there is no significant crease delamination in the area of the bending region. A small persistent deformation can be countered by mechanical means such as for example a strong hinge mechanism in the device. However, the total persistent deformation refers to the deformation that remains after a certain amount of time following release of the bendable element from the bent state.

The user of an electronic device will expect that the device reverts to its original shape very fast. Care must be taken that the bendable element has a limited deformation recovery time $b_1$. If the bendable element has a large deformation recovery time, it takes a long time for the element to reverts to its original shape and/or to reach its total persistent deformation. Keeping in mind the creep resistance of any polymer layers and recovery behavior of any non-polymer layers, including their recovery time, bendable elements can be designed that revert to their original shape after being released from a bent state.

When discussing the time needed for the bendable element to revert to its original shape, the phenomenon of creep is relevant. If a material used in the bendable element has the tendency to creep, it is very important that the deformation recovery time is kept short. In an embodiment, the deformation recovery time $b_1$ of the bendable element and/or one or more non-polymer layers is less than 5 hours, less than 4 hours, less than 3 hours or less than 2 hours. Optionally, the deformation recovery time may be >0.1 hours.

The bendable element can have a thickness of less than 800 µm, or less than 500 µm, or less than 400 µm, or less than 300 µm or less than 250 am, or less than 200 µm. Generally, the smaller the thickness of the bendable element, the easier it will be to bend it to small bend radii. However, if the thickness is very small, the element may be unable to withstand mechanical impact. The length of the bendable element can be at least 0.5 cm, at least 2.0 cm, at least 2.2 cm, or at least 4.5 cm, and/or the width can be at least 0.4 cm, at least 2.0 cm, at least 2.2 cm, or at least 3.5 cm. The length can be larger than the width. Optionally, the length is at least 100 mm.

The bendable element can comprise a plurality of layers. One or more layers can be polymer layers and/or one or more layers may be non-polymer layers. Polymer layers can have a tendency to creep. As used herein, the sum of the thicknesses of all polymer layers in the bendable element is referred to as the total polymer thickness PT. Adhesive layers, such as OCA and PSA layers, are not considered polymer layers or non-polymer layers in the context of this disclosure. The sum of the thicknesses of all non-polymer layers is referred to as the total non-polymer thickness NPT. It was found that adjusting the total polymer thickness in a range of from 0.0 µm to 600 µm and/or the total non-polymer thickness from 20.0 µm to 200 µm has a positive influence on the desired persistent deformation and deformation recovery time. Optionally, the total non-polymer thickness can be less than 100 µm, or less than 80 µm or less than 50 µm.

In certain embodiments, the ratio PT/NPT ranges from 0.0 to <5.0, or from >0.0 to <4.0. The ratio can be limited to less than 3.0 or less then 2.0, or less than 1.5 or even less than 1.0. In an embodiment, NPT is less than 70 µm and PT/NPT ranges from 0.0 to <5.0, or from >3.0 to <4.5. In another embodiment, NPT is at least 70 µm and PT/NPT ranges from 0.0 to <2.0.

When a bendable element is bent, deformation takes place. The strongest deformation will be in the bending region, where the element is under the highest stress, wherein a tensile stress may be induced on the primary surface of the bendable element that faces away from the bending axis (outer surface) and/or a compressive stress may be induced on the primary surface of the bendable element that faces towards the bending axis (inner surface). After releasing the bendable element from the bent state, it will at least in part assume its original form. Herein, the deformation is measured immediately after releasing the bendable element from the bent state ("initial deformation", $D_0$) and again at different time points after release ($D_t$). Deformation is measured with the bendable element standing on one of its edges, the edge being oriented perpendicular to the bending axis. For measurement, the element is placed in a fixture so that it is kept standing on the edge. The fixture may consist of two cuboid jigs each having a groove to accommodate a vertical edge of the standing element. The grooves have widths sufficient to accommodate the element without clamping it, e.g. the width of the grooves may exceed the thickness of the element by at least 10%. The element is inserted into the grooves to depths of about 4 to 8% of the element's length each. The depths of the grooves exceed the inserted lengths in order not to compress the element. The element is inserted into the grooves in an unbent state, i.e. the two grooves are oriented with their openings facing each other. The cuboid jigs may consist of a material with smooth surfaces, such as a ceramic or metal, e.g. steel. The surface roughness may be less than 5 µm $R_a$. The measurement may be performed on a smooth surface such as steel plate, optionally having a surface roughness of less than 5 µm.

The deformation or deformation distance is the distance between a maximum deformation point and a reference plane. The maximum deformation point is the point on the inner surface of the element that shows the strongest deformation, i.e. the topmost point of the "crease" in the element or the largest normal distance from the ideal plane of the element. The ideal plane is defined as the least squares fit plane of the bendable element (e.g. as described in ASTM F1390). The reference plane is the plane that includes two reference points on the inner surface of the element and extends in a vertical direction. The first reference point is located at a horizontal distance of 10 mm from the maximum deformation point in the direction of the first cuboid jig, and the second reference point is located at a horizontal distance of 10 mm from the maximum deformation point in the direction of the second cuboid jig.

The test conditions are 25° C. temperature and 30% relative humidity. $D_t$ is the deformation at time t. The inventors found that—depending on the material and geometry of the bendable element—there will often be a deformation that remains in the bending region of the bendable element. This persistent deformation is referred to as "total persistent deformation" or $a_0$. Deformation measurement may be performed on specimen having a width of at least 2.2 cm and a length of at least 2.2 cm. Optionally, the measurement may be performed on specimen having a width of about 100 mm and a length of about 150 mm.

The total persistent deformation $a_0$ can also be referred to as the deformation height that remains in the bendable element after deformation. Within this disclosure, if it is indicated that a bendable element or layer has certain deformation properties, such as deformation distance, total persistent deformation, deformation recovery time, this means that it has this property after bending with either of the primary surfaces facing towards the bending axis. It is sufficient that this property is achieved in one bending direction because this resembles the actual use in a bendable display.

The "primary surfaces" of an element are the two surfaces with the largest areas compared to any other surfaces of the element.

In the context of this disclosure, the deformation parameters are measured after bending the bendable element to a bending angle of about 180° between two Bakelite plates. If nothing else is indicated, bending is performed at room temperature (25° C.) and 30% relative humidity. Bending and deformation tests may, for example, be performed on bendable elements having a length of at least 100 mm.

The material and geometry of the bendable element does not only determine the persistent deformation of the bendable element but also the time needed for the element to assume its original—or close to original—shape. The deformation recovery time $b_1$ is defined in the following formulas.

Recovery of the deformation distance can be described using formula (1):

$$D_t = \sum_{i=0}^{n} a_i \cdot e^{\left(-\frac{t}{b_i}\right)} \quad \text{Formula (1)}$$

As mentioned above, $D_t$ is the deformation distance of the bendable element at time t. For the purposes of this description, formula (1) is simplified by choosing i=2:

$$D_t = a_0 + a_1 \cdot e^{\left(-\frac{t}{b_1}\right)} + a_2 \cdot e^{\left(-\frac{t}{b_2}\right)} \quad \text{Formula (2)}$$

For a bendable element to be useful in a foldable smartphone, $D_0(=a_0+a_1+a_2)$, which is the initial deformation distance, $b_1$, which can stand for the deformation recovery time, and $a_0$, which is the final deformation distance in the observation time, are critical parameters.

In an embodiment, the initial deformation of the bendable element and/or a non-polymer layer may be $D_0$<35 mm, <30 mm, <25 mm, <20 mm, <18 mm, <16 mm, or <14 mm. Optionally, $D_0$ may be >0.03 mm.

The "creep modulus" $E_c$ is used to describe the time-dependent deformation or "creep" of a material. The creep modulus is defined by the following formula, wherein a is the normal stress and $\varepsilon_{ges}$ is the time-dependent deformation:

$$E_c(t) = \frac{\sigma}{\varepsilon_{ges}(t)} \quad \text{Formula (3)}$$

The creep modulus can be measured using a tensile creep test according to DIN EN ISO 899-1:2017. For the purposes of this disclosure, the measurement is done at 25° C. and 30% relative humidity in order to account for a usual environment of smartphone operation. Creep modulus is a material characteristic that can be determined for any material. Creep modulus will be different for different polymers, it may even differ within one class of polymers depending on e.g. chain lengths and degrees of crosslinking. For typical uses of electronic devices, the creep modulus at comparably short times under stress is relevant. Another relevant parameter is the creep resistance, defined as the ratio of the creep modulus after 1000 hours under stress ($E_c(10^3$ h)) and the creep modulus after one hour under stress ($E_c(1$ h)). The higher the creep resistance is, the less creep is observed in a material.

The bending region is the part of the bendable element or layer where the largest stress occurs during bending the element or layer. For a display of an electronic device, this will typically be in the region of the hinge of the device.

As used herein, the term "bendable" includes "foldable".

The expression that the bendable element or any layer within the bendable element "can be bent to a bending radius of X mm without failure" or that the bendable element has a "bending radius of X mm" means that the element does not break when bent to 180° between two parallel Bakelite plates to the indicated bending radius. If nothing else is indicated the test is performed at a temperature of 25° C. and a relative humidity of 30%.

Non-Polymer Layers

The bendable element can comprise one or more non-polymer layers. In an embodiment, the bendable element has at least one, at least two, at least three or at least four non-polymer layers. Optionally, at least one polymer and/or adhesive layer is disposed between non-polymer layers. In preferred embodiments, the bendable element has one or two non-polymer layers. Preferred non-polymer layers include layers of glass, glass ceramic, ceramic, metal and combinations thereof. In an embodiment, the bendable element comprises one or more bendable glass layers.

The non-polymer layer or layers can have a thickness of less than 200 µm, less than 150 µm, less than 100 µm, less than 80 µm, or less than 70 µm. The non-polymer layer or layers can help reduce the total persistent deformation. If polymers with high creep modulus are used, very thin non-polymer layers may be applied. Generally, thinner non-polymer layers allow for smaller bend radii of the bendable element. In an embodiment, the thickness of at least one non-polymer layer is 60 µm or less, 50 µm or less, or 40 µm or less. In some embodiments, the thickness of at least one non-polymer layer may be at least 5 µm, at least 10 µm, at least 20 µm or at least 25 µm.

The bendable element may comprise one or more polarizer layers. Optionally, the bendable element can be disposed on top of a polarizer layer. Optionally, the polarizer layer is disposed between a pressure-sensitive adhesive layer and an optically clear adhesive (OCA) layer. Optionally, the polarizer layer has a thickness of less than 50 µm, less than 40 µm, or less than 30 µm and/or a thickness of at least 5 µm, at least 10 µm, at least 15 µm or at least 20 µm. Optionally the polarizer layer has a thickness of 5 to 50 µm, 10 to 40 µm, 15 to 30 µm or 20 to 30 µm.

In an embodiment, the cumulative thickness of all non-polymer layers in the bendable element may be less than 200 µm, less than 150 µm, less than 100 µm, less than 80 µm, or less than 70 µm. If polymers with high creep modulus are used, the cumulative thickness may be small. Generally, thinner non-polymer layers allow for smaller bend radii of the bendable element. In an embodiment, the cumulative thickness of all non-polymer layers in the bendable element is 60 µm or less, 50 µm or less, or 40 µm or less. In some embodiments, the cumulative thickness of all non-polymer layers in the bendable element may be at least 5 µm, at least 10 µm, at least 20 µm or at least 25 µm.

In order to avoid an irregular shape of the bendable element it may be useful to restrict the warp of the bendable element and/or its layers, such as its non-polymer layer or layers. The warp of the bendable element and/or the non-polymer layer may be 2.0 mm or less, 1.0 mm or less or 0.5 mm or less. The warp may be measured as described in SEMI MF1390.

The bendable element should be as uniform as possible in order to avoid local property deviations. In embodiments, the bendable element and/or the non-polymer layer may have a total thickness variation of not more than 10 μm, not more than 7 μm or more than 5 μm. The total thickness variation is the difference between the highest thickness and the lowest thickness of the bendable element and/or the non-polymer layer. It can be measured as described in SEMI MF1530 on a specimen of the non-polymer layer or bendable element of 50×50 mm² or 100×150 mm².

The bendable element and/or non-polymer layer can have a surface roughness $R_a$ of not more than 5.0 nm, not more than 3.0 nm or not more than 1.5 nm. A small surface roughness provides for a surface which is easy to clean.

The bendable element and/or the non-polymer layer can have a two point bending strength of at least 700 MPa, or at least 800 MPa, at least 900 MPa or at least 1000 MPa. The bending strength can be measured using the 2PB method and the average bending strength of the bendable element and/or non-polymer layer may be larger than 850 MPa, more than 900 MPa, more than 950 MPa, or more than 1000 MPa.

The foldability of the bendable element may be measured by the bending radius, which can be less than 20 mm, less than 10 mm, less than 7 mm, less than 5 mm, or even less than 4 mm. In an embodiment, the bending radius may be at least 0.5 mm, at least 1 mm, or at least 2 mm, or at least 3 mm.

The non-polymer layer can exhibit compressive stress on one or both of its primary surfaces. The compressive stress may be at least 100 MPa, at least 200 MPa, at least 400 MPa, at least 500 MPa or at least 700 MPa. Compressive stress may be limited to a maximum of 2000 MPa, up to 1500 MPa, up to 1200 MPa or up to 1100 MPa. A compressive stress helps the bendable element and/or non-polymer layer withstand bending to small bend radii. Compressive stress can be achieved by laminating layers of different thermal expansion and/or by ion exchange treatment. In preferred embodiments, the non-polymer layer is chemically toughened by ion exchange treatment such as ion exchange in a potassium nitrate bath.

The depth of a compressive stress layer DoL on one or both of the primary surfaces of the non-polymer layer may be at least 1.0 μm, at least 5.0 μm and or at least 10.0 μm. The DoL can be up to 50 μm, up to 40 μm or up to 30 μm. In certain embodiments, DoL is up to about 30% of the thickness of the non-polymer layer or optionally up to 25%, up to 20%, up to 15% or up to 10% of the thickness of the non-polymer layer.

The non-polymer layer can have a Young's modulus of more than 50 GPa, more than 60 GPa or more than 70 GPa. In certain embodiments, the Young's modulus is limited to less than 200 MPa, less than 150 MPa or less than 100 MPa. High Young's modulus corresponds to a stiffer material. The indicated range helps achieve the desired total persistent deformation and deformation recovery time for the bendable element. Optionally, Young's modulus may be >50 GPa, >55 GPa, >60 GPa, >65.5 GPa, >71.5 GPa, or >72 GPa. In an embodiment, Young's modulus is <120 GPa.

Optionally, one or more of any non-polymer layers in the bendable element can have a shear modulus >23.5 GPa, >25.6 GPa, >27.1 GPa, >29.2 GPa, >29.6 GPa, or >29.8 GPa; and/or <40.2 GPa.

The non-polymer layer can exhibit a fracture toughness $K_{IC}$ of not more than 4.0 MPa√m, not more than 2.2 MPa√m, not more than 1.0 MPa√m or not more than 0.7 MPa√m. The fracture toughness indicates the material's ability to withstand cracks. In certain embodiments, the fracture toughness is at least 0.5 MPa√m. The non-polymer material can have a Poisson's ratio of at least 0.10, or at least 0.15. Optionally, the Poisson's ratio can be less than 0.28. Young's modulus E and Shear modulus G: follows a simple relation E=2G(1+v), where v is the Poisson's ratio. The shear modulus of the non-polymer layer is preferred to be more than 23.5 GPa.

The non-polymer material can have a fragility m of less than 42. Fragility reflects the degree to which the temperature dependence of the viscosity (or relaxation time) deviates from Arrhenius behavior: materials with a higher fragility have a relatively narrow glass transition temperature range, while those with low fragility have a relatively broad glass transition temperature range. The most common definition of fragility is the "kinetic fragility index" m, which characterizes the slope of the viscosity(or relaxation time) of a material with temperature as it approaches the glass transition temperature from above:

$$m := \left(\frac{\partial \log_{10}\eta}{\partial (T_g/T)}\right)_{T=T_g} = \frac{1}{\ln 10}\left(\frac{\partial \ln \eta}{\partial (T_g/T)}\right)_{T=T_g} = \frac{T_g}{\ln 10}\left(\frac{-\partial \ln \eta}{\partial T}\right)_{T=T_g}$$

Formula (4)

where η is viscosity, $T_g$ is the glass transition temperature, m is fragility, and T is temperature. It was found that a relatively high fragility of at least 18 or at least 26 provides for lower persistent deformation.

It is desirable that the non-polymer material has a sufficient hardness, such as a Knoop hardness of at least 450 MPa. Polymer layers usually do not contribute significantly to the hardness of the bendable element. Thus, sufficiently hard non-polymer material should be used. In embodiment, the Knoop hardness of the non-polymer layer can be as follows: $HV_{0.2/25}$>400 MPa, and/or $HK_{0.1/20}$>350 MPa. After chemical toughening the values may be $HV_{0.2/25}$>450 MPa, and/or $HK_{0.1/20}$>400 MPa. Optionally, the values may be $HV_{0.2/25}$>500 MPa, and/or $HK_{0.1/20}$>450 MPa.

It is desirable that the bendable element is sufficiently thin to achieve excellent bending properties. If the element is very thin, care should be taken that the desired mechanical stability is achieved. Thus, according to an embodiment, the non-polymer layer and/or the bendable element can have a pen drop height of at least 20.0 mm to impart the bendable element with sufficient strength. In certain embodiments, the inorganic material layer has a scratch resistance larger than 6H and/or a pen drop height larger than 30 mm, in particular for thicknesses of at least 0.07 mm. The weight of the pen is around 5 g and the tip of the pen is made of tungsten carbide with a radius of 150 μm. In certain embodiments, the non-polymer layer and/or the bendable element exhibits a pen drop height in the unbent state of at least 50 mm, at least 60 mm, at least 70 mm, at least 80 mm, at least 90 mm, or at least 100 mm, or at least 120 mm, or at least 150 mm. The pen drop height of the non-polymer layer and/or the bendable element, particularly of the non-polymer layer in the bendable element, is preferred to be larger than 40 mm when the bendable element is unbent. The test setup for the pen drop test is described with reference to FIGS. 12 and 13 below.

The pen drop height of the non-polymer layer and/or the bendable element, particularly of the non-polymer layer in the bendable element, can be at least 20 mm when the element is bent to a bending radius of 10 mm, and in particular when the element is bent to a bending radius of 8 mm or 6 mm. The pen drop height is preferred to be at least 15 mm when the bending radius of the inorganic material is 8 mm and in particular when the bending radius of the non-polymer layer and/or the bendable element is 6 mm or 4 mm. The pen drop height is preferred to be larger than 10 mm when the bending radius of the non-polymer layer and/or the bendable element is 6 mm and in particular when the bending radius of the inorganic material 4 mm or 2 mm.

When the bending radius of the non-polymer layer and/or the bendable element is 4 mm, and in particular when the bending radius of the non-polymer layer and/or the bendable element is 8 mm or 6 mm, it is desirable that the non-polymer layer and/or the bendable element has a ratio of the pen drop height in the bent state to the pen drop height in the unbent state of not less than 20%, not less than 25%, or not less than 30%.

In preferred embodiments, the bendable element is foldable at least 100,000 times, in particular at least 200,000 times without breakage. This may apply to a bending radius of 20 mm or 10 mm. Further, it may apply to infoldable and/or outfoldable displays and/or bendable elements.

The non-polymer layer may be glass which contains alkali metal oxides so that it can be chemically toughened. For inorganic material of toughened glass the CS (compressive stress) can be in the range of 200 to 2000 MPa and/or the DoL (depth of layer) can be in the range of 2 μm<DoL<half the thickness of the non-polymer layer.

One or more properties discussed above for the non-polymer layer may apply to one or more non-polymer layers present in the bendable element. In an embodiment, one or more of the properties above apply to all non-polymer layers of the bendable element. In an embodiment, all the properties discussed above apply to all non-polymer layers of the bendable element.

Polymer Layers

The properties of the bendable element can be adjusted by using various combinations of non-polymer layers and polymer layers. Depending on the desired application of the bendable element, different layers and sequences of layers may be useful. In an embodiment, the bendable element comprises one or more bendable polymer layers. For example, the bendable element may comprise one, two, three, four, five, six or more polymer layers. Optionally, the bendable element comprises from 1 to 10, or from 1 to 8, or from 1 to 6 or from 1 to 4 polymer layers.

In an embodiment, at least one polymer layer has a thickness of 1.0 μm or more. Polymer layer thickness should be adjusted based on the properties of the non-polymer layers in the bendable element. For example, if a non-polymer layer is used that has a very low total persistent deformation and/or a very short deformation recovery time, thicker polymer layers or more polymer layers can be used compared to a bendable element having non-polymer layers with higher total persistent deformation and/or longer deformation recovery time. At least one polymer layer can have a thickness of 5.0 μm or more, 10.0 μm or more, 20.0 μm or more, 30.0 μm or more or 40.0 μm or more. Optionally, the thickness of the polymer layer may be limited to a maximum of 200.0 μm, or up to 150.0 μm or up to 100.0 μm. The thickness limitations may apply to one, two, three and/or all polymer layers in the bendable element.

In an embodiment, a total thickness of all polymer layers (PT) in the bendable element is 1.0 μm or more. Polymer layer thickness should be adjusted based on the properties of the non-polymer layers in the bendable element. For example, if a non-polymer layer is used that has a very low total persistent deformation and/or a very short deformation recovery time, thicker polymer layers or more polymer layers can be used compared to a bendable element having non-polymer layers with higher total persistent deformation and/or longer deformation recovery time. A total thickness of all polymer layers in the bendable element may be 5.0 μm or more, 10.0 μm or more, 20.0 μm or more, 30.0 μm or more or 40.0 μm or more. Optionally, the total thickness of the polymer layers may be limited to a maximum of 200.0 μm, or up to 150.0 am or up to 100.0 μm. In an embodiment, the total polymer thickness is from 70 μm to 125 μm.

Polymer layers can be laminated to non-polymer layers. Alternatively or additionally, polymer layers may be coated onto non-polymer layers or other polymer layers. Coated layers, if made of polymer, and laminated polymer layers are both referred to as polymer layers in this disclosure.

In an embodiment, the bendable element of this disclosure has at least one coating on at least one of its primary surfaces. The coating can have a thickness of 1.0 μm or more, 5.0 μm or more or 8.0 μm or more. The thickness of the coating may be limited to a maximum of 25.0 μm.

If polymer layers are used for the bendable element, it should be made sure that the influence the polymer has on persistent deformation and recovery time are tolerable. It was found that the polymer's creep behavior and plastic deformation may be of relevance. The polymer's property to undergo plastic deformation can be expressed with reference to the loss modulus or the loss factor (tan δ), which is the ratio of loss modulus and storage modulus. For the purposes of this disclosure, the loss factor may be determined at 25° C. and 30% relative humidity by dynamic mechanical analysis (DMA), e.g. according to ISO 6721-6:2019. The loss factor is a material property. The higher the creep resistance and the lower tan δ, the more of the polymer can be used in the bendable element without jeopardizing its properties in terms of persistent deformation and recovery time. In an embodiment, one or more or all polymer layers are characterized by a tan δ not more than 0.4. In certain embodiments, tan δ may be less than 0.3, less than 0.2, less than 0.1, or less than 0.05. Optionally, tan δ of one or more polymer layers in the bendable element may be at least 0.001, at least 0.01 or at least 0.02, at least 0.03 or at least 0.04. In one embodiment, the one or more polymer layers have a tan δ of 0.001 to 0.4, 0.01 to 0.4, 0.02 to 0.3, 0.03 to 0.2, or 0.04 to 0.1.

In an embodiment, one or more of the polymer layers comprise or consist of polyimide (PI). Optionally, the one or more or all of the polymer layers comprising or consisting of PI has a tan δ of 0.4 or less, 0.3 or less, 0.2 or less, 0.1 or less, or 0.07 or less, and/or a tan δ of at least 0.01, at least 0.02, or at least 0.03. Optionally, the one or more or all of the polymer layers comprising or consisting of PI has a tan δ of 0.01 to 0.4, 0.02 to 0.3, 0.02 to 0.2, 0.03 to 0.1, or 0.03 to 0.07.

In another embodiment, the one or more or all of the polymer layers comprising or consisting of polyethylene terephthalate (PET) has a tan δ of 0.4 or less, 0.3 or less, 0.2 or less, or 0.1 or less, and a tan δ of at least 0.01, at least 0.02, or at least 0.04. In a related embodiment, the one or more or all of the polymer layers comprising or consisting of PET has a tan δ of 0.01 to 0.4, 0.02 to 0.3, 0.03 to 0.2, or 0.04 to 0.1.

In an embodiment, the one or more polymer layers are characterized by a persistent deformation factor of not more than 2.0, wherein the persistent deformation factor is the creep resistance plus tan δ of the polymer material. In certain embodiments, the persistent deformation factor can be less than 1.5, less than 1.3, less than 1.1, or less than 1.0. The persistent deformation factor indicates the polymer layer's property to influence the total persistent deformation and deformation recovery time of the bendable element. The persistent deformation factor is determined not only by the chemical composition of the polymer, but also by the entanglement of the polymer chains in the polymer composition and any additives in the polymer such as plasticizers etc. The persistent deformation factor can be determined as described above. Optionally, the persistent deformation factor of one or more polymer layers in the bendable element can be at least 0.75, at least 0.80 or at least 0.85.

In an embodiment, one or more or all of the polymer layers in the bendable element exhibit a creep resistance of at least 0.40, at least 0.45, at least 0.50, at least 0.55, at least 0.60, at least 0.65, at least 0.70, at least 0.72 or at least 0.74. This means that the polymer or composition that the polymer layer is made of exhibits the indicated creep resistance. Creep resistance is a material property that can be measured easily for any material as discussed above. Optionally, the creep resistance can be in a range of from 0.65 to 0.90, or from 0.70 to 0.88. A larger creep resistance helps avoid formation of creases in the hinge region of a display in an electronic device. In an embodiment, one or more or all of the polymer layers comprise or consist of a polymer selected from the types PI, PET or PC having the creep resistance as given above. Creep resistance may be measured on the polymer layer before assembly of the bendable element. The underlying creep modulus of the polymer layer may be measured at an initial tension of at least 5 MPa, at least 10 MPa, at least 15 MPa, or at least 20 MPa and/or at an initial tension of 100 MPa or less, 80 MPa or less, 60 MPa or less, or 40 MPa or less. Accordingly, the creep modulus of the polymer layer may be measured at an initial tension of 5 to 100 MPa, 10 to 80 MPa, 15 to 60 MPa, or 20 to 40 MPa. The initial tension ($\sigma=F/A$) during the creep modulus measurement has only minor up to negligible influence, and the skilled person knows how to choose the initial tension parameter. The creep modulus of the polymer layer may for example be measured at an initial tension of 10 MPa, 20 MPa, or 40 MPa. The creep resistance of the polymer layer is material-dependent and process-dependent, i.e. process-dependent means any process or means of manufacturing that the polymer layer was subject to, e.g. film orientation may have an influence on the creep resistance. Preferably, the creep resistance of the polymer layer is determined in orthogonal direction to the bending axis within the plane of the polymer layer. Alternatively, the creep resistance of the polymer layer may be determined in parallel direction to the bending axis within the plane of the polymer layer. Within the different polymer types there may be polymers that have the desired creep resistance and others that do not fulfil the criterion. The skilled person can easily determine the creep resistance before choosing the polymer for the polymer layer. In embodiments, one or more or all polymer layers of the bendable element may have a creep resistance of up to 1.0, up to 0.95, up to 0.90, up to 0.88, up to 0.86, up to 0.85, up to 0.83 or up to 0.81. In one embodiment, one or more or all of the polymer layers in the bendable element exhibit a creep resistance of 0.40 to 1.0, 0.45 to 0.95, 0.50 to 0.90, 0.55 to 0.88, 0.60 to 0.86, or 0.65 to 0.85, 0.70 to 0.84, 0.72 to 0.84 or 0.74 to 0.84.

In an embodiment, the one or more or all of the polymer layers comprising or consisting of PI has a creep resistance of at least 0.65, at least 0.70, at least 0.72 or at least 0.74, and/or a creep resistance of 0.90 or less, 0.88 or less, 0.86 or less, or 0.84 or less. In an embodiment, the one or more or all of the polymer layers comprising or consisting of PI has a creep resistance of 0.65 to 0.90, 0.70 to 0.88, 0.72 to 0.86, or 0.74 to 0.84. Preferably, the creep resistance of the polymer layer comprising or consisting of PI is determined in orthogonal direction to the bending axis within the plane of the polymer layer. Alternatively, the creep resistance of the polymer layer comprising or consisting of PI may be determined in parallel direction to the bending axis within the plane of the polymer layer.

In another embodiment, the one or more or all of the polymer layers comprising or consisting of PET has a creep resistance of at least 0.40, at least 0.45, at least 0.50, at least 0.55, at least 0.60 or at least 0.65, and/or a creep resistance of 1.0 or less, 0.95 or less, 0.90 or less, or 0.85 or less. In a related embodiment, the one or more or all of the polymer layers comprising or consisting of PET has a creep resistance of 0.40 to 1.0, 0.45 to 0.95, 0.50 to 0.9, 0.55 to 0.85, 0.60 to 0.85, or 0.65 to 0.85. Preferably, the creep resistance of the polymer layer comprising or consisting of PET is determined in orthogonal direction to the bending axis within the plane of the polymer layer. Alternatively, the creep resistance of the polymer layer comprising or consisting of PET may be determined in parallel direction to the bending axis within the plane of the polymer layer.

One or more or all of the polymer layers of the bendable element can have a Young's modulus in the range of from 2.5 to 8.0 GPa, or from 2.7 to 6.5 GPa. Optionally, Young's modulus can be at least 2.5 GPa, at least 2.7 GPa, or at least 4.5 GPa.

Typically, the coefficient of thermal expansion (CTE) of a polymer is larger than that of inorganic non-polymer material such as glass or glass ceramic. It helps avoid delamination of a bendable element of non-polymer layer and polymer layer, if the coefficient of thermal expansion of one or more or all of the polymer layers is not more than 50 ppm/K, not more than 40 ppm/K or not more than 35 ppm/K. Optionally, CTE may be limited to less than 25 ppm/K or less than 15 ppm/K.

In an embodiment, the weighted average total persistent deformation factors of the polymer layers in the bendable element may be less than 1.5, less than 1.3, or less than 1.0. The weights correspond to the thickness of each polymer layer. For example, a bendable element can comprise three polymer layers, a first layer has a thickness of 20 µm and a persistent deformation factor of 1.3, a second layer has a thickness of 50 µm and a total persistent deformation factor of 1.1, and a third layer has a thickness of 70 µm and a total persistent deformation factor of 1.6. The weighted average total persistent deformation factor of the polymer layers will then be:

$$\frac{20\ \mu m \cdot 1.3 + 50\ \mu m \cdot 1.8 + 70\ \mu m \cdot 1.6}{140\ \mu m} = 1.38.$$

Optionally, the weighted average total persistent deformation factors of the polymer layers in the bendable element may be at least 0.65, at least 0.75 or at least 0.80.

Generally, the polymers of the one or more polymer layers should have good compatibility with the non-polymer material of the one or more non-polymer layers. In embodiments, the water drop contact angle of a polymer of the one or more polymer layers differs to the water drop contact angle of the inorganic material by less than 30°, less than 20°, less than 10°. The contact angle can be measured by using a commercial contact angle testing machine, e.g. according to DIN 55660-2:2011.

The polymer may provide a comparatively fragile non-polymer layer with a mechanical reinforcement. It may also function as a security means by immobilizing splinters and particles in case of a fracture of the non-polymer layer. The polymers of one or more polymer layer may be selected from polystyrene (PS), poly(ethylene terephthalate) (PET), ethylene glycol modified poly(ethylene terephthalate) (PETG), poly(ethylene-vinyl acetate) (EVA), polycarbonate (PC), polyimide (PI), polyvinyl chloride (PVC), polyvinyl butyral (PVB), thermoplastic polyurethanes (TPU), or poly (methyl methacrylate) (PMMA), more preferably from polyvinyl butyral (PVB), thermoplastic polyurethanes (TPU), ethylene glycol modified poly(ethylene terephthalate) (PETG), poly(ethylene-vinyl acetate) (EVA), polycarbonate (PC), polyethylene (PE), epoxy resin, and combinations thereof.

A polymer layer can be laminated onto a non-polymer layer. In an embodiment, a polymer layer can be coated onto a non-polymer layer. The polymer layer may cover the non-polymer layer essentially completely, i.e. the polymer layer may cover a surface of a non-polymer layer to an extent of at least 50%, at least 60%, at least 70%, at least 80%, at least 90%, at least 95%, or at least 99%, optionally with one or more additional layers in between.

In an embodiment, one or more or all of the polymer layers are attached to one or more non-polymer layers by means of one or more adhesive layers. Suitable adhesives are optically clear adhesives and/or pressure sensitive adhesives.

According to an advantageous embodiment, one or more or all of the polymer layers has a thickness of at least 1.0 µm, preferably of at least 5.0 µm, further preferably of at least 10.0 µm, more preferably of at least 20.0 µm, most preferably of at least 40.0 µm to reach the desired properties. An upper limit for the thickness of a polymer layer could be 250.0 µm, 200.0 µm, 150.0 µm or 100.0 µm. In an embodiment, one or more or all of the polymer layers has a thickness in the range of from 30.0 µm to about 70.0 µm.

A polymer layer may be laminated onto a non-polymer layer, or it may be printed or coated thereon, or it may be attached by means of an adhesive layer. Lamination can be performed by different known methods.

In addition, or as an alternative to the above-mentioned polymers, the polymer material for one or more polymer layers may be selected for example from the group consisting of a silicone polymer, a sol-gel polymer, polycarbonate (PC), polyethersulphone, polyacrylate, polyimide (PI), an inorganic silica/polymer hybrid, a cycloolefin copolymer, a polyolefin, a silicone resin, polyethylene (PE), polypropylene, polypropylenepolyvinyl chloride, polystyrene, styrene-acrylonitrile copolymer, thermoplastic polyurethane resin (TPU), polymethyl methacrylate (PMMA), ethylene-vinyl acetate copolymer, polyethylene terephthalate (PET), polybutylene terephthalate, polyamide (PA), polyacetal, polyphenyleneoxide, polyphenylenesulfide, fluorinated polymer, a chlorinated polymer, ethylene-tetrafluoroethylene (ETFE), polytetrafluoroethylene (PTFE), polyvinyl chloride (PVC), polyvinylidene chloride (PVDC), polyvinylidene fluoride (PVDF), polyethylene naphthalate (PEN), a terpolymer made of tetrafluroethylene, a terpolymer made of hexafluoropropylene, and a terpolymer made of vinylidene fluoride (THV) or polyurethane, or mixtures thereof. Optionally, a polymer layer can be applied onto a non-polymer layer by any known method.

In an embodiment, the bendable element comprises at least one polymer layer of PET having a creep resistance of at least 0.72. In an embodiment, the bendable element comprises at least one polymer layer of PI having a creep resistance of at least 0.72. In an embodiment, the bendable element comprises at least one polymer layer of PC having a creep resistance of at least 0.72. According to an embodiment, a polymer layer is coated onto the inorganic material layer. The coating of a protective polymer layer can be applied by any known coating method such as chemical vapor deposition method (CVD), dip-coating, spin-coating, ink-jet, casting, screen printing, painting and spraying. However, the disclosure is not limited to those procedures. Suitable coating materials are also known in the art. For example, they can comprise a duroplastic reaction resin that is a polymer selected from the group consisting of phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, silicone resins, cross-linking polyurethane resins, polymethacrylate reaction resins, and polyacrylate reaction resins.

The bendable element may comprise one or more laminated polymer layers, and the polymer layer or layers have a thickness of >1 µm, >5 µm, >10 µm, >20 µm, or >40 µm. Optionally, the thickness of the polymer layer or polymer layers is 200 µm.

At least one surface of a non-polymer layer may be coated with a coating polymer layer or a plurality of coating layers, the coating layer having a thickness of >1.0 µm, >3.0 µm, >4.0 µm, >8.00 µm, or >10.0 µm. Optionally, the thickness of the one or more coating layers may be <200.0 µm, less than 100.0 µm, less than 50.0 µm, less than 35.0 µm or less than 20.0 µm.

In an embodiment, the bendable element has one non-polymer layer of glass and comprises at least one or at least two PET layers. Each of the PET layers can be thicker than the non-polymer layer. Optionally, one PET layer may be attached to the non-polymer layer on opposing sides thereof. Attachment may be achieved by an adhesive such as an optically clear adhesive (OCA). The thickness of the adhesive layers may be less than the thickness of the non-polymer layer.

In one embodiment, the one or more polymer layer has a creep resistance in a vertical direction and a creep resistance in a horizontal direction, wherein the vertical direction and the horizontal direction are oriented perpendicular to each other within the plane of the one or more polymer layer. In a preferred embodiment of the one or more polymer layer, the creep resistance in a vertical direction is at least 1.05 times larger than the creep resistance in a horizontal direction, at least 1.1 times larger, at least 1.2 times larger, or at least 1.5 times larger, and/or the creep resistance in a vertical direction is less than 3.0 times larger than the creep resistance in a horizontal direction, less than 2.5 times larger, less than 2.0 times larger, or less than 1.8 times larger.

Adhesive Layer

One or more adhesive layers can be used to attach a polymer layer to a non-polymer layer. Optionally, two polymer layers may be attached to a non-polymer layer on opposing sides thereof. The attachment may be achieved by one or more adhesive layers.

The thickness of one or more, or all, adhesive layers in the bendable element may be less than the thickness of one or more, or all, of the polymer layers. The thickness of all adhesive layers in the bendable element may be larger than the thickness of one or more, or all, of the non-polymer layers.

The adhesive of the adhesive layer or layers may be an optically clear adhesive (OCA) and/or a pressure sensitive adhesive (PSA). The adhesives are preferably chosen from OCA, acrylates, methacrylates, polystyrenes, silicones and epoxides. The adhesives may be of the pressure-sensitive type, reactive type, or hot melt type. In an embodiment, the adhesive layer or layers provides adhesion between layers and/or structural stability to the bendable element.

The adhesive used in the adhesive layer may have a loss factor of less than 0.5 or less than 0.4 at 25° C. Optionally, the loss factor at 25° C. may be at least 0.01, at least 0.1 or at least 0.2. Full recovery of the adhesive after bending is desirable. The adhesive may have a CTE of about 30 to $50*10^{-5}/K$ in the temperature range of from 0 to 60° C.

The adhesive layer may be chosen such that its creep resistance is matched to the polymer layer, i.e. the one or more or all of the polymer layers. The adhesive layer can have a creep resistance of at least 0.01, at least 0.02, at least 0.03 or at least 0.04, and/or a creep resistance of 0.40 or less, 0.30 or less, 0.20 or less, or 0.10 or less. Accordingly, the adhesive layer may have a creep resistance of 0.01 to 0.40, 0.02 to 0.30, 0.03 to 0.20, or 0.04 to 0.10.

In one embodiment, the creep resistance of the adhesive layer is at least 1% of the creep resistance of the one or more or all of the polymer layers, optionally at least 3%, at least 5%, at least 7%, or at least 9%. In one embodiment, the creep resistance of the adhesive layer is 20% of the creep resistance of the one or more or all of the polymer layers or less, 18% or less, 16% or less, 14% or less, or 12% or less. Accordingly, the creep resistance of the adhesive layer is from 1 to 20% of the creep resistance of the one or more or all of the polymer layers, from 3 to 18%, from 5 to 16%, from 7 to 14%, or from 9 to 12%.

The thickness of one or more or all of the adhesive layers can range from 10.0 µm to 100.0 µm, or from 15.0 µm to 65.0 µm or from 20.0 µm to 40.0 µm. The adhesive layer or adhesive layers may have a cumulative thickness, which is larger than the thickness of one or more or all of the non-polymer layers. Optionally, the adhesive layer or layers are thinner than one or more or all of the polymer layers. The thickness of one or more or all of the adhesive layers may be in a range of less than 100 µm, less than 80 µm, less than 60 µm, less than 40 µm, or less than 30 µm. Optionally, the thickness of one or more or all of the adhesive layers may be at least 10 µm, or at least 15 µm. The adhesive layer or layers may be coated, printed, or laminated to a non-polymer layer or polymer layer. The adhesive layer may essentially completely cover a surface of non-polymer layer and/or polymer layer, i.e. the adhesive layer may cover the surface to an extent of at least 50%, at least 60%, at least 70%, at least 80%, at least 90%, at least 95%, or at least 99%.

The adhesive can provide an adhesive force of non-polymer layer to polymer layer of >1.0 N/cm, >1.5 N/cm, >2.0 N/cm, >2.5 N/cm, >3.0 N/cm, while <20 N/cm, <18 N/cm at 25° C. The peel force may be determined by peeling off the polymer layer from the glass layer at an angle of 180° at a peel rate of 300 mm/min. The result is the average force needed to peel off the polymer layer relative to the width of the polymer layer.

Coating

The bendable element may have a coating on one or more of its primary surfaces. A coating may protect the underlying surface from scratches. The coating can be a hard coating. The hard coating may be an acrylic-based hard coating, i.e. the coating comprises an acrylic polymer. An optional coating layer is not considered a polymer layer or non-polymer layer in the context of this disclosure.

The hard coating can have a thickness of less than 20 µm, less than 15 µm, less than 10 µm, less than 8 µm, or less than 7 µm. The hard coating may have a thickness of at least 0.55 µm, at least 1.0 µm, at least 2.0 µm or at least 2.5 µm.

The coating of can be applied by any known coating method such as chemical vapor deposition method (CVD), dip-coating, spin-coating, ink-jet, casting, screen printing, painting and/or spraying. However, the disclosure is not limited to those procedures. Suitable coating materials are known in the art. For example they can comprise a duroplastic reaction resin that is a polymer selected from the group consisting of phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, silicone resins, cross-linking polyurethane resins, polymethacrylate reaction resins, and polyacrylate reaction resins.

Glass Layers

In preferred embodiments, the bendable element comprises one or more glass layers. The glass layer is a non-polymer layer. There may be other non-polymer layers in addition to the glass layer, or the glass layer may be the only non-polymer layer.

Glass has the advantage that it is impermeable to gases, in particular to water vapor. This is very useful in display devices as the glass can seal the delicate electronic parts of the device from the surrounding atmosphere. Glass is also very durable and surprisingly bendable.

The glass layer may be characterized with reference to a total persistent deformation and a deformation recovery time. In certain embodiments, a glass is used for the glass layer that has a total persistent deformation $a_0$ at 50 µm thickness of not more than 1.75 mm and/or a deformation recovery time $b_1$ of less than 6 hours.

In certain embodiments, the glass of the glass layer has a total persistent deformation $a_0$ at 30 µm thickness of not more than 1.0 mm and/or a deformation recovery time $b_1$ of less than 6 hours. Optionally, the glass of the glass layer may have a total persistent deformation $a_0$ at 30 µm thickness of not more than 0.9 mm and/or a deformation recovery time $b_1$ of less than 5 hours.

In embodiments, the glass of the glass layer has a total persistent deformation $a_0$ at 50 µm thickness of not more than 1.3 mm and/or a deformation recovery time $b_1$ of less than 6 hours. Optionally, the glass of the glass layer may have a total persistent deformation $a_0$ at 50 µm thickness of not more than 1.2 mm and/or a deformation recovery time $b_1$ of less than 5 hours or less than 4 hours.

In embodiments, the glass of the glass layer has a total persistent deformation $a_0$ at 70 µm thickness of not more than 1.5 mm and/or a deformation recovery time $b_1$ of less than 6 hours. Optionally, the glass of the glass layer may have a total persistent deformation $a_0$ at 70 µm thickness of not more than 1.25 mm and/or a deformation recovery time $b_1$ of less than 5 hours or less than 4 hours.

In embodiments, the glass of the glass layer has a total persistent deformation $a_0$ at 100 µm thickness of not more than 1.65 mm and/or a deformation recovery time $b_1$ of less than 6 hours. Optionally, the glass of the glass layer may have a total persistent deformation $a_0$ at 100 µm thickness of not more than 1.35 mm and/or a deformation recovery time $b_1$ of less than 5 hours.

The glass layer may be obtained by selecting suitable glass layers on the basis of desired parameters given herein. Preferably, the glass layer or layers in the bendable element can be ultrathin glass (UTG) layers. Such layers can be produced by polishing or etching away an amount of glass from a thicker glass. However, this method is often not economical and may lead to bad surface quality which is quantified by $R_a$ roughness for example.

Direct hot-forming production like down draw or overflow fusion methods are preferred for mass production. The redraw method may also be used. These methods are economical and the glass surface quality is high and glass with thicknesses ranging from 5 μm (or even less) to 500 μm can be produced. For example, the down-draw/overflow fusion method may produce pristine or fire-polished surfaces. The glass layer may have a surface roughness $R_a$ of less than 5 nm, less than 2 nm, or less than 1 nm. The thickness may be precisely controlled ranging from 5 μm and 500 μm. Small thickness makes the glass flexible.

Average roughness ($R_a$) is a measure of the texture of a surface. It is quantified by the vertical deviations of a real surface from its ideal form. Commonly amplitude parameters characterize the surface based on the vertical deviations of the roughness profile from the mean line. $R_a$ is the arithmetic average of the absolute values of these vertical deviations. It can be determined according to DIN EN ISO 4287:2010-07.

Optional strengthening, also called toughening, can be done by immersing glass into a molten salt bath with potassium ions or cover the glass with a paste containing potassium ions or other alkaline metal ions and heat it to high temperatures for a certain time. The alkaline metal ions with larger ion radius in the salt bath or the paste exchange with alkaline metal ions with smaller radius in the glass layer, and surface compressive stress is formed due to ion exchange.

Compressive stress (CS) is the induced compression of the glass network after ion-exchange on the surface layer of glass. Such compression is not released by deformation of glass and sustained as stress. CS decreases from a maximum value at the surface of the glass layer (surface CS) towards the inside of the glass layer. Commercially available test machines such as FSM6000 (company "Luceo Co., Ltd.", Japan/Tokyo) can be used to measure the CS by wave guide mechanism or by SLP1000 (company "ORIHARA", Japan), which measure the CS by scattered light mechanism.

Depth of layer (DoL) is the thickness of an ion-exchanged layer, i.e. a region where CS exists. Commercially available test machines such as FSM6000 (company "Luceo Co., Ltd.", Japan/Tokyo) can be used to measure the DoL by wave guide mechanism.

Central tension (CT): When CS is induced on one side or both sides of a glass sheet, to balance the stress according to the $3^{rd}$ principle of Newton's law, a tension stress must be induced in the center region of glass, and it is called central tension. CT can be calculated from measured CS and DoL.

A chemically toughened glass layer that can be used as non-polymer layer is obtained by chemically toughening a chemically toughenable glass. The toughening process may be done by immersing the glass layer into a salt bath which contains monovalent ions to exchange with alkali ions inside the glass. The monovalent ions in the salt bath have radii larger than alkali ions inside the glass. A compressive stress to the glass is built up after ion-exchange due to larger ions squeezing into the glass network. After ion-exchange, the strength and flexibility of glass are significantly improved. In addition, the CS induced by chemical toughening improves the bending properties of the toughened glass layer and increases scratch resistance of the glass layer.

Optional salt baths for chemical toughening are $Na^+$-containing or $K^+$-containing molten salt baths or mixtures thereof. Optional salts are $NaNO_3$, $KNO_3$, $NaCl$, $KCl$, $K_2SO_4$, $Na_2SO_4$, $Na_2CO_3$, and $K_2CO_3$. Additives like NaOH, KOH and other sodium salt or potassium salt may be used for better controlling the speed of ion-exchange, CS and DoL during chemical toughening. These methods may be applied to the glass layers described herein.

Chemical toughening is not limited to a single step. It can include multi steps in one or more salt baths with alkaline metal ions of various concentrations to reach better toughening performance. Thus, the chemically toughened glass layer can be toughened in one step or in the course of several steps, e.g. two steps.

A chemically toughened glass layer can have just one primary surface (first surface) under compressive stress extending from the first surface to a first depth in the glass layer. In this case, the glass layer comprises only one toughened side, which in the case of the protective cover of the disclosure may be the side facing away from the display electronics and/or facing toward the user. Preferably, the glass layer comprises a second compressive stress region extending from the second primary surface to a second depth in the glass layer (DoL), the region is defined by a compressive stress wherein the surface compressive stress (CS) at the second surface may be at least 100 MPa. The second surface is located opposite to the first surface. Thus, the glass layer may be toughened on both sides.

Compressive stress (CS) mostly depends on the composition of glass. Higher content of $Al_2O_3$ can be helpful to achieve higher compressive stress. To reach balanced hot-forming capabilities and chemical toughening performance, the surface compressive stress may be below 1200 MPa on one or both primary surfaces. After toughening, the glass should have sufficiently high compressive stress to achieve high strength. Therefore, surface compressive stress at the first surface and/or at the second surface may be at least 100 MPa, at least 200 MPa, at least 300 MPa, at least 400 MPa, or at least 500 MPa. In embodiments, surface compressive stress may be at least 600 MPa, at least 700 MPa, or at least 800 MPa. Of course, the CS at the first surface and the CS at the second surface can be essentially the same or different.

Generally, DoL depends on glass composition, but it can increase nearly infinitely with increased toughening time and toughening temperature. A defined DoL is important to ensure the stable strength of toughened glass, but too high of a DoL increases the self-breakage ratio and the strength performance when the inorganic material layer is under compressive stress.

It will be advantageous for the stress profile of the glass layer if the glass layer has a DoL (in μm) in a range of 0.5 μm to 150*t/CS μm (t given in μm, CS=figure of surface compressive stress (given in MPa)) measured at a first surface. Preferably the glass layer has a DoL (in μm) in a range of from 0.5 μm to 120*t/CS μm, from 1 μm to 120*t/CS μm, a DoL (in μm) in a range of from 0.5 μm to 90*t/CS μm, or from 1 μm to 90*t/CS μm. Some embodiments has a DoL (in μm) in a range of 0.5 μm to 60*t/CS μm, or from 1 μm to 60*t/CS μm. Other advantageous embodiments have a DoL (in μm) in a range of from 0.5 μm to 45*t/CS μm, or from 1 μm to 45*t/CS μm. Other embodiments may have a DoL (in μm) in a range of from 0.5 μm to 27*t/CS μm, or from 1 μm to 27*t/CS μm. In the above given calculations "x*t/CS" means that x is multiplied by the thickness of the glass layer and divided by the figure of the measured surface CS wherein x can be 150, 120, 90, 60, 45, or 27.

The value of DoL depends in each case on the glass composition, the thickness and applied CS of the respective glass layer. In general, glass layers according to the above mentioned embodiments have a quite low DoL. By decreasing the DoL, the CT decreases. If high force is applied on such embodiments by sharp objects, the caused defects will—within a certain force range—be on the glass surface without causing the glass layer to break.

According to another variant, the glass layer may have a DoL(in μm) in a range of 27*t/CS μm to 0.5*t μm (t given in μm, CS=figure of surface compressive stress (given in MPa) measured at a first surface), or a DoL (in μm) in a range of from 45*t/CS μm to 0.45*t μm, or a DoL (in μm) in a range of 60*t/CS μm to 0.4*t μm, or a DoL (in μm) in a range of 90*t/CS μm to 0.35*t μm. In the above given calculations, "y*t/CS" means that y is multiplied by the thickness of the glass layer and divided by the figure of the measured surface CS wherein y can be 27, 45, 60, or 90. "z*t" means that z is multiplied by the thickness of the glass layer wherein z can be 0.5, 0.45, 0.4, or 0.35.

According to an embodiment, the toughened glass layer has a CT of less than or equal to 200 MPa, less than or equal to 150 MPa, less than or equal to 120 MPa, or less than or equal to 100 MPa. Some embodiments can have a CT of less than or equal to 65 MPa. Other embodiments can have a CT of less than or equal to 45 MPa. Some variants even have a CT of less than or equal to 25 MPa. These CT values are particularly advantageous for glass layers belonging to the low DoL variant.

Because of the low DoL those glass layers have a decreased internal CT. Decreased CT highly influences the press resistance of the toughened glass layer. Even if sharp and hard objects damage the toughened surface of a glass layer having a quite low CT the layer does not break as the internal strength of the glass structure cannot be overcome by the low CT.

Alternatively, it may be advantageous for glass layers belonging to a high DoL variant if they have a central tensile stress (CT) of at least 27 MPa, at least 45 MPa, at least 65 MPa, or at least 100 MPa.

As mentioned above CS, DoL and CT depends on the glass composition (glass type), glass thickness and toughening conditions.

Glass Compositions

The present disclosure refers to the compositions in weight percentages based on the total weight of the glass layer. The glass of the glass layer may have certain preferred compositions that will be outlined below. In this description, the "glass" refers to the glass of the non-polymer layer as disclosed herein. In an embodiment, the glass may be a silicate glass, such as alumosilicate glass or borosilicate glass. The glass may contain alkali metal oxides, optionally in an amount sufficient to allow chemical tempering.

The glass may comprise the following components, in weight percent: $SiO_2$ 45.0 to 75.0 wt.-%, $B_2O_3$ 0 to 5.0 wt.-%, $Al_2O_3$ 2.5 to 25.0 wt.-%, $Li_2O$ 0 to 10.0 wt.-%, $Na_2O$ 5.0 to 20.0 wt.-%, $K_2O$ 0 to 10.0 wt.-%, MgO 0 to 15.0 wt.-%, CaO 0 to 10.0 wt.-%, BaO 0 to 5.0 wt.-%, ZnO 0 to 5.0 wt.-%, $TiO_2$ 0 to 2.5 wt.-%, $ZrO_2$ 0 to 5.0 wt.-%, $P_2O_5$ 0 to 20.0 wt.-%. In preferred embodiments, the glass consists of the components mentioned in the before-mentioned list to an extent of at least 95.0 wt.-%, more preferably at least 97.0 wt.-%, most preferably at least 99.0 wt.-%.

The terms "X-free" and "free of component X", respectively, as used herein, preferably refer to a glass, which essentially does not comprise said component X, i.e. such component may be present in the glass at most as an impurity or contamination, however, it is not added to the glass composition as an individual component. This means that the component X is not added in essential amounts. Non-essential amounts according to the present disclosure are amounts of less than 100 ppm (m/m), preferably less than 50 ppm, and more preferably less than 10 ppm. Thereby "X" may refer to any component, such as lead cations or arsenic cations. Preferably, the glasses described herein do essentially not contain any components that are not mentioned in this description.

In an embodiment, the glass may comprise the following components, in weight percent: $SiO_2$ 45.0 to 72.0 wt.-%, $B_2O_3$ 0 to 4.7 wt.-%, $Al_2O_3$ 4.0 to 24.0 wt.-%, $Li_2O$ 0 to 6.0 wt.-%, $Na_2O$ 8.0 to 18.0 wt.-%, $K_2O$ 0 to 8.0 wt.-%, MgO 0 to 10.0 wt.-%, CaO 0 to 3.0 wt.-%, BaO 0 to 2.0 wt.-%, ZnO 0 to 3.0 wt.-%, $TiO_2$ 0 to 1.0 wt.-%, $ZrO_2$ 0 to 4.6 wt.-%, $P_2O_5$ 0 to 15.0 wt.-%.

In an embodiment, the glass may comprise the following components, in weight percent: $SiO_2$ 51.0 to 65.0 wt.-%, $B_2O_3$ 0 to 4.7 wt.-%, $Al_2O_3$ 11.0 to 24.0 wt.-%, $Li_2O$ 0 to 6.0 wt.-%, $Na_2O$ 8.0 to 18.0 wt.-%, $K_2O$ 0 to 8.0 wt.-%, MgO 0 to 5.5 wt.-%, CaO 0 to 1.0 wt.-%, BaO 0 to 1.0 wt.-%, ZnO 0 to 3.0 wt.-%, $TiO_2$ 0 to 1.0 wt.-%, $ZrO_2$ 0 to 4.6 wt.-%, $P_2O_5$ 0 to 10.0 wt.-%.

In an embodiment, the glass may comprise the following components, in weight percent: $SiO_2$ 45.0 to 72.0 wt.-%, $B_2O_3$ 0 to 4.7 wt.-%, $Al_2O_3$ 4.0 to 24.0 wt.-%, $Li_2O$ 0 to 3.0 wt.-%, $Na_2O$ 8.0 to 18.0 wt.-%, $K_2O$ 0 to 8.0 wt.-%, MgO 0 to 5.5 wt.-%, CaO 0 to 1.0 wt.-%, BaO 0 to 2.0 wt.-%, ZnO 0 to 3.0 wt.-%, $TiO_2$ 0 to 1.0 wt.-%, $ZrO_2$ 0 to 3.0 wt.-%, $P_2O_5$ 0 to 15.0 wt.-%.

Preferably, the glass comprises $SiO_2$ in proportions of 45.0 to 75.0 wt.-%, and more preferably in proportions of 50.0 to 72.0 wt.-%. Silicon is an important network former in the glass matrix which is very important for the glass properties. In particular, silicon cations are important for the chemical resistance, hardness and scratch resistance of the glass. In preferable embodiments, the glass comprises at least 48.0 wt.-% of $SiO_2$, more preferably at least 50.0 wt.-% of $SiO_2$, still more preferably at least 51.0 wt.-% of silicon, and most preferably at least 54.0 wt.-% of $SiO_2$. However, very high contents of $SiO_2$ may result in an increase of the glass transition temperature, making glass production uneconomical. Therefore, it is preferable that the content of $SiO_2$ is at most 75.0 wt.-%, further preferable at most 72.0 wt.-%, still more preferable at most 70.0 wt.-%, and most preferable at most 65.0 wt.-%.

Besides silicon the glass can also comprise at least one second network former. The glass may contain $Al_2O_3$ in proportions of 2.5 to 25.0 wt.-%, more preferably 4.0 to 24.0 wt.-%. The addition of $Al_2O_3$ results in improved glass forming properties and generally supports the improvement of chemical resistance. In embodiments, the glass comprises at least 2.5 wt.-% of $Al_2O_3$, more preferably at least 4.0 wt.-% of $Al_2O_3$, still more preferably at least 11.0 wt.-% of aluminum, and most preferably at least 15.0 wt.-% of $Al_2O_3$. However, too high contents of $Al_2O_3$ result in an increased tendency to crystallization. Therefore, it is preferable that the content of $Al_2O_3$ is at most 25.0 wt.-%, further preferable at most 24.0 wt.-%, still more preferable at most 21.0 wt.-%, and most preferable at most 19.0 wt.-%.

The glass may contain $B_2O_3$ in proportions of 0.0 to 5.0 wt.-%, more preferably in proportions of 0.0 to 4.7 wt.-%. Through its network forming properties boron cations may support the stability of the glass. In embodiments, the glass comprises at least 0.05 wt.-% of $B_2O_3$. Nevertheless, in the case of too high contents of boron in the glass the viscosity may be reduced strongly so that a reduction of the crystallization stability has to be accepted. Therefore, it is preferable that the content of boron is at most 3.0 wt.-% $B_2O_3$, further preferable at most 2.0 wt.-%, still more preferable at most 1.0 wt.-%, and most preferable at most 0.8 wt.-%. In certain embodiments, the glass is free of $B_2O_3$.

In the glass, the sum of the proportions of $SiO_2$ and $Al_2O_3$ may be from 65.0 to 85.0 wt.-%, more preferably from 68.0 to 82.0 wt.-%. In embodiments, the sum of $SiO_2$ and $Al_2O_3$ in the glass is at least 65.0 wt.-%, preferably at least 68.0 wt.-%, still more preferably at least 70.0 wt.-%, and most preferably at least 75.0 wt.-%. It is preferable that the sum of $SiO_2$ and $Al_2O_3$ in the glass is at most 85.0 wt.-%, preferable at most 82.0 wt.-%, and optionally at most 80.0 wt.-%.

The mechanical properties of the glass are strongly determined by the network formers aluminum, silicon and boron in the glass. Therefore, the glass may have a ratio of the sum of $Al_2O_3$ and $B_2O_3$ to the amount of $SiO_2$ in weight percentages of from 0 to 1. Preferably, this ratio is from >0 to 0.8, more preferably from >0.20 to 0.60, and most preferably from 0.25 to 0.50.

The glass may contain alkali metal oxides and/or alkaline earth metal oxides. Preferably, the sum of these oxides $\Sigma\{\Sigma R^{2+}(R=Mg, Ca, Sr, Ba)+\Sigma R^{+}(R'=Li, Na, K)\}$ is 10.0 to 30.0 wt.-%. These oxides allow the glass to be chemically toughened and/or melted in an economical way. Very high amounts may limit the chemical or hydrolytic resistance of the glass. In preferable embodiments the sum of alkali metal oxides and alkaline earth metal oxides in the glass is at least 12.0 wt.-%, more preferably at least 13.0 wt.-%, preferably at least 14.0 wt.-%, and most preferably at least 18.0 wt.-%. In an embodiment, the sum of alkali metal oxides and alkaline earth metal oxides in the glass is at most 30.0 wt.-%, further preferable at most 28.0 wt.-%, still more preferable at most 25.0 wt.-%, and most preferable at most 22.0 wt.-%.

Alkali metal oxides improve the meltability of the glass and thus allow for a more economic production. Also, they may be necessary for chemical strengthening of the glass by ion exchange treatment. During the production of the glass the alkali metal oxides serve as fluxing agents. The sum of the amounts of the alkali metal oxides of lithium, sodium and potassium in the glass may be 9.0 to 20.0 wt.-%. In preferable embodiments the sum of the alkali metal oxides is at least 12.0 wt.-%, more preferably at least 14.0 wt.-%, and still more preferably at least 15.0 wt. However, if contents of alkali metal oxides are too high the weathering resistance of the glass may be compromised and thus the range of applications thereof may strongly be limited. Too high contents of alkali metal cations lead to a decrease in chemical stability because these monovalent ions may compromise the bridging Si—O bonds. Therefore, it is preferable that the sum of the alkali metal cations is at most 20.0 wt.-%, further preferable at most 19.0 wt.-%, more preferable at most 18.0 wt.-%, and optionally at most 17.0 wt.-%.

In the glass, preferably lithium oxide ($Li_2O$) is contained in proportions of 0.0 to 10.0 wt.-%. Lithium serves as a fluxing agent and has excellent properties for ion exchange strengthening. However, lithium affects chemical stability of the glass to a great extent so that its content should be limited. It is preferable that the content of lithium oxide is at most 10.0 wt.-%, further preferable at most 6.0 wt.-%, still more preferable at most 3.0 wt.-%, and most preferable at most 1.0 wt.-%. In preferable embodiments, the glass is free of lithium oxide.

Sodium oxide ($Na_2O$) may be contained in proportions of 5.0 to 20.0 wt.-%, and preferably 8.0 to 18.0 wt.-%. Sodium is a good component for ion exchange treatment. But—as with all alkali metal ions—the amount of this component should not be too high because it decreases chemical stability. In preferable embodiments, the glass comprises at least 5.0 wt.-% of sodium oxide, more preferably at least 6.0 wt.-%, still more preferably at least 8.0 wt.-%, and most preferably at least 10.0 wt.-% or at least 11.0 wt.-% of sodium oxide. It is preferable that the content of sodium oxide is at most 20.0 wt.-%, further preferable at most 18.0 wt.-%, still more preferable at most 16.5 wt.-%, and most preferable at most 14.5 wt.-%.

Potassium oxide ($K_2O$) may be contained in the glass in proportions of 0.0 to 10.0 wt.-%, more preferably 0.0 to 8.0 wt.-%. The negative impact of potassium on chemical stability is less strong compared to the other alkali metal ions. However, potassium is not suitable for ion exchange treatment. In preferable embodiments the glass comprises at least 0.5 wt.-% of potassium oxide, more preferably at least 2.0 wt.-%, still more preferably at least 3.0 wt.-%, and most preferably at least 3.5 wt.-% of potassium oxide. It is preferable that the content of potassium oxide is at most 10.0 wt.-%, further preferable at most 8.0 wt.-%, and still more preferable at most 5.0 wt.-%.

It has been found that the leaching tendency of the substrate glass can be reduced by using both sodium and potassium oxides in the glass. Keeping the ratio of sodium oxide to potassium oxide in wt.-% low, e.g. up to 10.0, up to 6.0 or up to 3.5, i.e. the sodium does not exceed a certain amount relative to the amount of potassium, provides for glass having good meltability and excellent chemical and hydrolytic resistance. Optionally, the glass may have an HGB1 according to ISO 719:1989. However, in order to adjust the viscosity in the melt to a desirable value, the ratio of sodium oxide to potassium oxide in wt.-% should be at least 1.5, more preferably at least 2.0, or at least 2.5.

Alkaline earth metal oxides may improve the meltability of the glass and thus allow for an economic production. During the production of the glass, they may serve as fluxing agents. The sum of the alkaline earth metal oxides magnesium, barium and calcium in the glass may be 0.0 to 15.0 wt.-%, more preferably 0.0 to 8.0 wt.-%. Alkaline earth metal oxides affect chemical resistance of the glass with little positive effects in terms of ion exchange treatment. Hence, the glass does preferably not comprise too high an amount of alkali earth metal oxides. It is particularly preferable that the sum of the alkali earth metal oxides in the glass is at most 15.0 wt.-%, further preferable at most 12.0 wt.-%, still more preferable at most 8.0 wt.-%, and most preferable at most 5.0 wt.-%. Moreover, alkaline earth metal oxides and zinc oxides may be used to adjust the viscosity of the glass, particularly the fine tuning of the viscosity-temperature profile. Moreover, alkaline earth metal oxides and zinc oxides—like alkali metal oxides—may be used as fluxing agents. The glass may be free of at least one oxide selected from the group consisting of magnesium oxide, calcium oxide, strontium oxide, barium oxide and zinc oxide. Preferably, the glass is free of zinc oxide, strontium oxide and barium oxide.

In certain embodiments, zinc oxide (ZnO) is contained in proportions of 0.0 to 5.0 wt.-%. It is preferable that the content of zinc oxide is at most 5.0 wt.-%, and more preferably at most 3.0 wt.-%. In preferable embodiments, the glass is free of zinc oxide. Calcium oxide is contained in proportions of 0.0 to 10.0 wt.-%. It is preferable that the content of calcium oxide is at most 3.0 wt.-%, and further preferable at most 1.0 wt.-%. In some embodiments, the glass is free of calcium oxide. Barium oxides may be present in the glass in proportions of 0.0 to 5.0 wt.-%. It is preferable that the content of barium oxide is at most 3.0 wt.-%, further preferable at most 2.0 wt.-%, and more preferable at most 1.0 wt.-%. In embodiments, the glass is free of barium oxide. In preferable embodiments, the glass is free of strontium oxide.

Magnesium oxide (MgO) may be contained in proportions of 0.0 to 15.0 wt.-%, and more preferably 0.0 to 10.0 wt.-%. Magnesium oxide may be contained in the glass as an additional fluxing agent as well as for adjusting the melting point. By the addition of the network modifier magnesium oxide, the melting point of the glass may be reduced. In embodiments, the glass comprises at least 1.0 wt.-% of magnesium oxide, more preferably at least 2.5 wt.-%, and more preferably at least 3.0 wt.-% of magnesium oxide. However, too high a content of magnesium oxide may result in a reduction of the melting point of the glass. It is preferable that the content of magnesium oxide is at most 10.0 wt.-%, or at most 5.5 wt.-%.

Titanium oxide ($TiO_2$) can be contained in proportions of 0.0 to 2.5 wt.-%. Titanium oxide may be added to the glass for improving its optical properties. In particular, with the help of additions of titanium the refractive index of the glass can be adjusted. The refractive index increases with an increasing content of titanium oxide in the glass. The addition of titanium oxide is connected with a further advantage: the UV edge of the transmittance spectrum of the glass may be shifted to higher wave lengths, wherein this shift is higher, when more titanium is added. However, too high a content of titanium oxide may result in undesirable crystallization. Titanium oxide may increase the refractive index of the glass. Particularly, together with zirconium oxide, titanium may deteriorate transmission in the blue spectral range and, thus, may shift the UV-edge into the longer wave lengths. Therefore, it is particularly preferable that the content of titanium oxide is at most 1.0 wt.-%, and further preferable at most 0.5 wt.-%. In embodiments, the glass is free of titanium oxide.

Zirconium oxide ($ZrO_2$) can be contained in proportions of 0.0 to 5.0 wt.-%, and more preferably 0.0 to 4.6 wt.-%. Zirconium oxide may be used to adjust the refractive index of the glass. In embodiments, the glass comprises at least 0.1 wt.-% of zirconium oxide, more preferably at least 0.6 wt.-%, and still more preferably at least 1.0 wt.-%. However, too high a content of zirconium oxide may decrease the meltability and particularly may lead to stronger crystallization. It is preferable that the content of zirconium oxide is at most 5.0 wt.-%, further preferable at most 4.6 wt.-%, and still more preferable at most 3.0 wt.-%. In embodiments, the glass is free of zirconium oxide.

The glass may comprise $P_2O_5$ in proportions of 0.0 to 20.0 wt.-%. In embodiments, the glass comprises at least 3.0 wt.-% of $P_2O_5$, more preferably at least 4.5 wt.-% of $P_2O_5$, and still more preferably at least 9.5 wt.-% of cerium. It is preferable that the content of $P_2O_5$ is at most 20.0 wt.-%, further preferable at most 15.0 wt.-%, and still more preferable at most 10.0 wt.-%. In embodiments, the glass is free of $P_2O_5$.

The disclosure includes a bendable element, wherein the glass layer is made of a glass having the following composition in weight percent:

| Composition (wt %) | |
|---|---|
| $SiO_2$ | 45.0 to 75.0% |
| $Al_2O_3$ | 2.5 to 25.0% |
| $Li_2O$ | 0.0 to 10.0% |
| $Na_2O$ | 5.0 to 20.0% |
| $K_2O$ | 0.0 to 10.0% |
| MgO | 0.0 to 15.0% |
| CaO | 0.0 to 10.0% |
| $P_2O_5$ | 0.0 to 20.0% |
| BaO | 0.0 to 5.0% |

-continued

| Composition (wt %) | |
|---|---|
| ZnO | 0.0 to 5.0% |
| $ZrO_2$ | 0.0 to 5.0% |
| $B_2O_3$ | 0.0 to 5.0% |
| $TiO_2$ | 0.0 to 2.5% |

Method of Bending

An aspect of this disclosure relates to a method of bending a bendable element, comprising bending a bendable element as described herein to a bend radius of less than 5.0 mm but no less than the element's 40 mm-initial deformation threshold.

Electronic Device

In another aspect, the disclosure relates to an electronic device having a foldable display comprising a bendable element as described herein, and at least one hinge allowing the display to be bent about a bending axis, wherein the electronic device is designed such that the display can be bent to a bending radius of no less than the 40 mm-initial deformation threshold of the bendable element.

The bendable element of this disclosure may be a part of a display of an electronic device. Displays of electronic device typically contain a polarizer layer. In this context, the bendable element may be disposed on top of a polarizer layer. The bendable element may be attached to a front polarizer layer of a display, e.g. by an adhesive layer, such as an OCA layer. Generally, a display of an electronic device comprises a display element, an optional touch element and a cover element. The bendable element described herein may constitute a cover element in a display.

The bendable element will typically be the topmost part of a display of an electronic device, i.e. facing towards the user. Further elements of the display are not part of the bendable element. For example, the bendable element does not comprise parts of a display element and/or the touch element, such as light guide plates, reflective plates, diffuser plates, brightness enhancing films, polarizing films, or LCD layers.

Bendable Element

In an embodiment, the bendable element can be bent to a bending radius of 10.0 mm, 8.0 mm or 4.0 mm without failure. Optionally, the bending element may have reduced persistent deformation characterized by a total persistent deformation $a_0$ of not more than 3.0 mm and/or a deformation recovery time $b_1$ of less than 10 hours after bending the element to a bending radius of 15.0 mm, 10.0 mm, 8.0 mm or 4.0 mm for 24 hours at 25° C. and 30% relative humidity.

In an embodiment, the bendable element may have an initial deformation distance Do at a 10.0 mm bend radius of not more than 40 mm, wherein the initial deformation distance is the height of the deformation distance measured immediately after releasing the bendable element from a 10.0 mm bend radius after 24 hours at 25° C. and 30% relative humidity. Optionally, the initial deformation distance Do at a 10.0 mm bend radius may be less than 35 mm, less than 30 mm or less than 25 mm.

In an embodiment, the bendable element may have a 40 mm-initial deformation threshold of less than 10.0 mm, wherein the 40 mm-initial deformation threshold indicates the bending radius to which the bendable element can be bent for 24 hours at 25° C. and 30% relative humidity without exceeding an initial deformation distance of 40 mm immediately after releasing the bendable element from the bend radius.

In an embodiment, the bendable element may have a 30 mm-initial deformation threshold of less than 10.0 mm, wherein the 30 mm-initial deformation threshold indicates the bending radius to which the bendable element can be bent for 24 hours at 25° C. and 30% relative humidity without exceeding an initial deformation distance of 30 mm immediately after releasing the bendable element from the bend radius.

In an embodiment, the bendable element may have a 20 mm-initial deformation threshold of less than 10.0 mm, wherein the 20 mm-initial deformation threshold indicates the bending radius to which the bendable element can be bent for 24 hours at 25° C. and 30% relative humidity without exceeding an initial deformation distance of 20 mm immediately after releasing the bendable element from the bend radius.

In an embodiment, the bendable element has at least one non-polymer layer and at least two polymer layers. In an embodiment, the bendable element has at least two non-polymer layers and at least two polymer layers.

Optionally, each polymer layer may be attached to a non-polymer layer by means of an adhesive layer, such as an OCA and/or PSA layer.

In an embodiment, the bendable element may comprise a glass layer having a thickness of 70.0 μm or less, two polymer layers disposed on opposing sides of the glass layer having thicknesses of 70.0 μm or less each, and two adhesive layers disposed on opposing sides of the glass layer between glass layer and polymer layers, wherein the cumulative thickness of the glass layer, the two polymer layers and the two adhesive layers is 250.0 μm or less. The polymer layers may comprise or consist of one or more polymers having a creep resistance of at least 0.70.

In an embodiment, bendable elements as described herein according to the various aspects of this disclosure can be bent to a bending radius of 10.0 mm without failure, the element having reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity.

In an embodiment, bendable elements as described herein according to the various aspects of this disclosure can be bent to a bending radius of 8.0 mm without failure, the element having reduced persistent deformation characterized by a total persistent deformation $a_0$ of not more than 3.0 mm and a deformation recovery time $b_1$ of less than 10 hours after bending the element to a bending radius of 10.0 mm for 24 hours at 25° C. and 30% relative humidity.

In an embodiment, bendable elements as described herein according to the various aspects of this disclosure can be bent to a bending radius of 4.0 mm without failure, the element having reduced persistent deformation characterized by a total persistent deformation $a_0$ of not more than 3.0 mm and a deformation recovery time $b_1$ of less than 10 hours after bending the element to a bending radius of 8.0 mm for 24 hours at 25° C. and 30% relative humidity.

In an embodiment, the initial deformation of the bendable element can be $D_0$<15.0 mm, <12.0 mm, <8.0 mm, or <5.0 mm. Optionally, Do may be >0.03 mm or >0.5 mm.

In an embodiment, the bendable element has a total persistent deformation $a_0$ of not more than 15.0 mm, not more than 10.0 mm, not more than 5.0 mm, not more than 3.0 mm or not more than 2.0 mm after bending the element to a bending radius of 15.0 mm for 24 hours at 25° C. and 30% relative humidity. In an embodiment, total persistent deformation $a_0$ may be less than 1.5 mm, less than 1.0 mm or less than 0.5 mm after bending the element to a bending radius of 15.0 mm for 24 hours at 25° C. and 30% relative humidity. In an embodiment, the bendable element has a total persistent deformation $a_0$ of not more than 15.0 mm, not more than 10.0 mm, not more than 5.0 mm, not more than 3.0 mm or not more than 2.0 mm after bending the element to a bending radius of 10.0 mm for 24 hours at 25° C. and 30% relative humidity. In an embodiment, total persistent deformation $a_0$ is less than 1.5 mm, less than 1.0 mm or less than 0.5 mm after bending the element to a bending radius of 10.0 mm for 24 hours at 25° C. and 30% relative humidity. In an embodiment, the bendable element has a total persistent deformation $a_0$ of not more than 15.0 mm, not more than 10.0 mm, not more than 5.0 mm, not more than 3.0 mm or not more than 2.0 mm after bending the element to a bending radius of 5.0 mm for 24 hours at 25° C. and 30% relative humidity. In an embodiment, total persistent deformation $a_0$ is less than 1.5 mm, less than 1.0 mm or less than 0.5 mm after bending the element to a bending radius of 5.0 mm for 24 hours at 25° C. and 30% relative humidity.

In an embodiment, the bendable element has a deformation recovery time $b_1$ of less than 10 hours, or less than 5 hours, or less than 3 hours after bending the element to a bending radius of 15.0 mm for 24 hours at 25° C. and 30% relative humidity. In an embodiment, the bendable element has a deformation recovery time $b_1$ of less than 10 hours, or less than 5 hours, or less than 3 hours after bending the element to a bending radius of 10.0 mm for 24 hours at 25° C. and 30% relative humidity. In an embodiment, the bendable element has a deformation recovery time $b_1$ of less than 10 hours, or less than 5 hours, or less than 3 hours after bending the element to a bending radius of 5.0 mm for 24 hours at 25° C. and 30% relative humidity.

In an embodiment, the bendable element is transparent in the visible wavelength range, e.g. in the range of from 400 nm to 780 nm. Optionally, the transmittance may be at least 60%, at least 70%, at least 80% or at least 90% over the complete visible wavelength range.

In an embodiment, the bendable element comprises one or more glass layers, one or more polymer layers, and one or more adhesive layers, wherein the element can be bent to a bending radius of 5.0 mm without failure, the element having reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity.

In an embodiment, the bendable element comprises one or more glass layers, one or more polymer layers, and one or more adhesive layers, wherein the element can be bent to a bending radius of 5.0 mm without failure, the element having reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity, wherein the one or more polymer layer comprises or consist of a PET layer and/or a PI layer, wherein the one or more polymer layer may have a creep resistance of 0.40 to 1.0, 0.45 to 0.95, 0.50 to 0.90, 0.55 to 0.88, 0.60 to 0.86, or 0.65 to 0.85, 0.70 to 0.84, 0.72 to 0.84 or 0.74 to 0.84 and/or wherein the one or more polymer layer may have a tan δ of 0.001 to 0.4, 0.01 to 0.4, 0.02 to 0.3, 0.03 to 0.2, or 0.04 to 0.1.

In an embodiment, the bendable element comprises one or more glass layers, one or more polymer layers, and one or more adhesive layers, wherein the element can be bent to a bending radius of 5.0 mm without failure, the element having reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity, wherein the one or more polymer layer comprises or consist of a PET layer and/or a PI layer, wherein the PI layer has a tan δ of 0.01 to 0.4, 0.02 to 0.3, 0.02 to 0.2, 0.03 to 0.1, or 0.03 to 0.07 and/or wherein the PET layer has a tan δ of 0.01 to 0.4, 0.02 to 0.3, 0.03 to 0.2, or 0.04 to 0.1, wherein the PI layer has a creep resistance of 0.65 to 0.90, 0.70 to 0.88, 0.72 to 0.86, or 0.74 to 0.84 and/or wherein the PET layer has a creep resistance of 0.40 to 1.0, 0.45 to 0.95, 0.50 to 0.9, 0.55 to 0.85, 0.60 to 0.85, or 0.65 to 0.85.

In an embodiment, the bendable element has a thickness, a length and a width, and having a first and a second primary surface, wherein the element can be bent to a bending radius of 5.0 mm without failure, the element having reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity, wherein the bendable element comprises one or more bendable glass layers, wherein the glass layer has a warp of not more than 2.0 mm, or not more than 1.0 mm.

In an embodiment, the bendable element has a thickness, a length and a width, and having a first and a second primary surface, wherein the element can be bent to a bending radius of 5.0 mm without failure, the element having reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity, wherein the bendable element comprises one or more bendable glass layers, wherein the glass layer has a warp of not more than 2.0 mm, or not more than 1.0 mm, wherein the bendable element comprises one or more polymer layers, wherein the one or more polymer layers may have a creep resistance of 0.40 to 1.0, 0.45 to 0.95, 0.50 to 0.90, 0.55 to 0.88, 0.60 to 0.86, or 0.65 to 0.85, 0.70 to 0.84, 0.72 to 0.84 or 0.74 to 0.84 and/or wherein the one or more polymer layer may have a tan δ of 0.001 to 0.4, 0.01 to 0.4, 0.02 to 0.3, 0.03 to 0.2, or 0.04 to 0.1.

In an embodiment, the bendable element comprises a glass layer having a thickness of 70.0 μm or less, two polymer layers disposed on opposing sides of the glass layer having thicknesses of 70.0 μm or less each, and two adhesive layers disposed on opposing sides of the glass layer between glass layer and polymer layers, wherein the cumulative thickness of the glass layer, the two polymer layers and the two adhesive layers is 250.0 μm or less, wherein one of the two polymer layers is a PET layer and/or wherein one of the two polymer layers is a PI layer.

In an alternative embodiment, the bendable element comprises a glass layer having a thickness of 70.0 μm or less, at least one polymer layer having a thickness of 100.0 μm or less each, and one or more adhesive layers, wherein one adhesive layer is disposed between the glass layer and the at least one polymer layer, optionally comprising a polarizer layer, wherein optionally one adhesive layer is disposed between the glass layer and the optional polarizer layer, wherein the cumulative thickness of the glass layer, the at least one polymer layer and the one or more adhesive layers is 250.0 μm or less, wherein the at least one polymer layer is a PET layer or a PI layer.

In an embodiment, the bendable element comprises a glass layer having a thickness of 70.0 μm or less, two polymer layers disposed on opposing sides of the glass layer having thicknesses of 70.0 μm or less each, and two adhesive layers disposed on opposing sides of the glass layer between glass layer and polymer layers, wherein the cumulative thickness of the glass layer, the two polymer layers and the two adhesive layers is 250.0 μm or less, wherein the adhesive of the adhesive layers may be an optically clear adhesive (OCA) and/or a pressure sensitive adhesive (PSA) chosen from acrylates, methacrylates, polystyrenes, silicones and epoxides, wherein the adhesive used in the adhesive layer may have a creep resistance of 0.01 to 0.40, 0.02 to 0.30, 0.03 to 0.20, or 0.04 to 0.10.

DETAILED DESCRIPTION OF THE DISCLOSURE

Figure 1A:
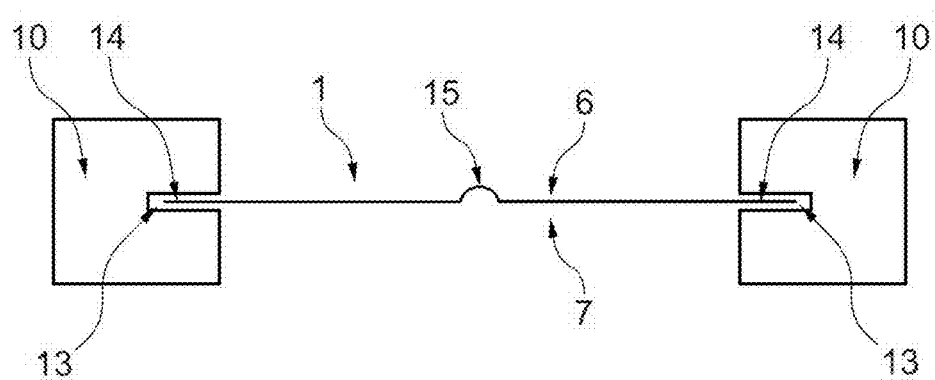
FIG. 1A is a schematic drawing of a bendable element within a fixture used for measuring the deformation.

FIG. 1A is a schematic drawing of a top view of a bendable element 1 in a fixture after bending. The figure shows the bendable element 1 held by two cuboid jigs 10 that hold the element in a standing position. Bendable element 1 has a crease 15 extending in a vertical direction, i.e. into the image plane. The extent of crease 15 is exaggerated for illustration purposes. Bendable element 1 has an inner surface 7 and an outer surface 6. Inner surface 7 includes the concave portion of crease 15. Cuboid jigs 10 feature grooves 13 into which the vertical edges 14 of bendable element 1 are inserted. The widths of grooves 13 are larger than the thickness of bendable element 1 in order not to clamp the element within the grooves. The depths of grooves 13 are larger than inserted lengths of bendable element 1 in order not to compress the element. The element is inserted in an unbent state, i.e. the openings of grooves 13 face each other and they do not induce the bendable element 1 to curve or bend during the evaluation.

Figure 1B:
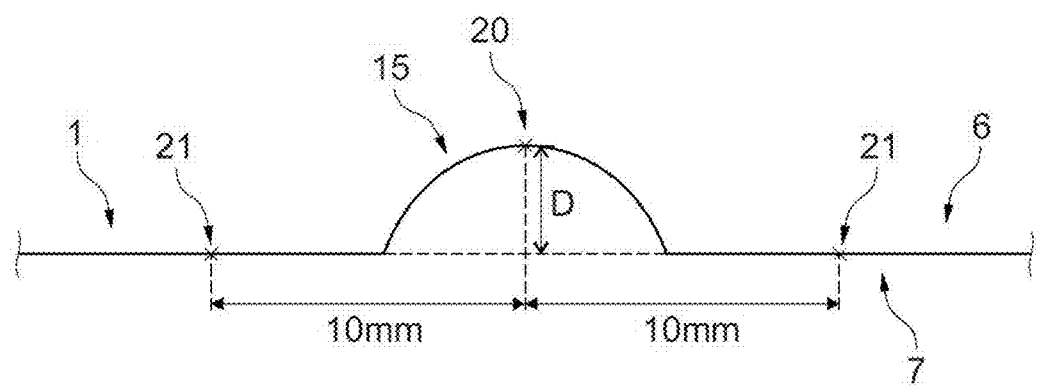
FIG. 1B is a schematic drawing of a bendable element illustrating the deformation distance based on maximum deformation point and reference plane.

FIG. 1B is a detail view of bendable element 1 according to FIG. 1A after bending. The element has a crease 15 as a result of bending. Crease 15 has a maximum deformation point 20 on the element's inner surface 7. A reference plane may be defined as the plane that extends in a vertical direction (into the image plane) and includes two reference points 21 on inner surface 7. Reference points 21 are at a horizontal distance of 10 mm from the maximum deformation point in the direction of the first and second cuboid jigs, respectively. In other words, reference points 21 are at a horizontal distance of 10 mm from the point where a normal to the reference plane that includes the maximum deformation point meets the reference plane. The deformation height D is the shortest distance of maximum deformation point 20 to the reference plane. The deformation height shown in this FIG. 1B is exaggerated for purposes of illustration.

Figure 2:
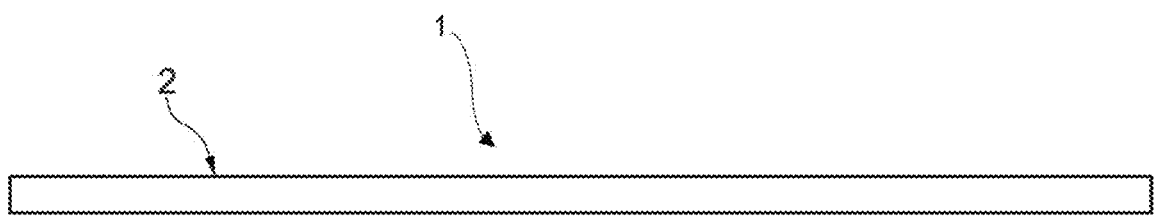
FIG. 2 is a schematic drawing of a bendable element of the present disclosure.

FIG. 2 shows a bendable element having a non-polymer layer 2. The non-polymer layer 2 can be a glass layer of 30 µm thickness. The non-polymer layer 2 is shown in an unbent state.

Figure 3:
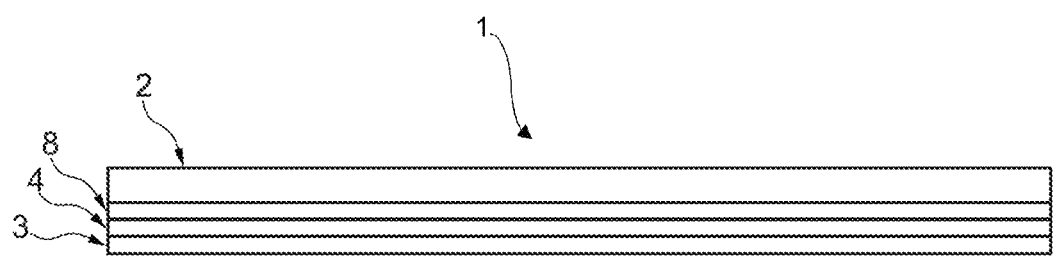
FIG. 3 is a schematic drawing of a multi-layered bendable element of the present disclosure.

FIG. 3 shows a bendable element 1 in accordance with an embodiment of the disclosure. The bendable element 1 has a non-polymer layer 2 which may be a glass layer. An optional polymer layer 4 such as a PI or PET layer may be attached to the non-polymer layer 2 using an optically clear adhesive (OCA) layer 8. A further OCA layer 3 may be present for attaching a bendable element 1 to a display element of an electronic device such as a smartphone. In an embodiment, the overall thickness of OCA layer 8, polymer layer 4 and OCA layer 3 add up to about 0.1 mm, and preferably from 75 to 125 µm.

Figure 4:
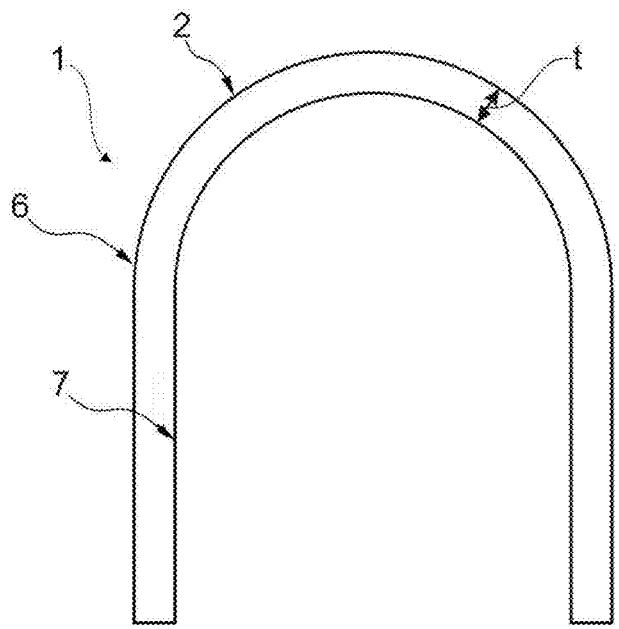
FIG. 4 is a schematic drawing of a bendable element of the present disclosure in a bent state.

FIG. 4 shows a bendable element 1 being bent. The element has a thickness t. The outer surface 6 is under tensile stress, which is elongated due to the tension stress and facing away from the bending axis. The inner surface 7 is under compression stress and facing towards the bending axis. The figure shows a bending angle of 180°.

Figure 5:
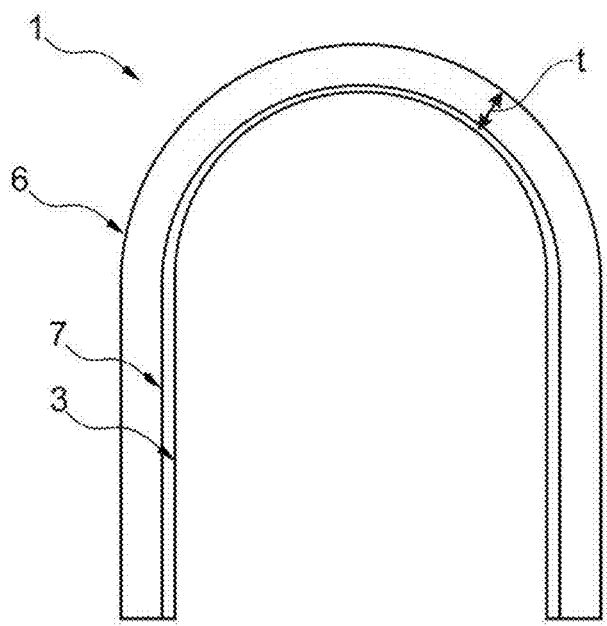
FIG. 5 is a schematic drawing of a multi-layered bendable element of the present disclosure in a bent state.

FIG. 5 shows a similar situation as FIG. 4, wherein an OCA layer 3 is present on the non-polymer layer 2.

FIGS. 6A to 11 show time-dependent deformation recovery for exemplary bendable elements of this disclosure.

Figure 12:
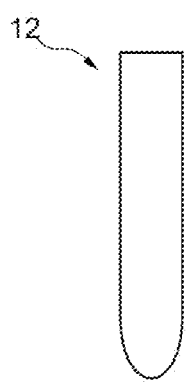
FIG. 12 is a schematic of the pen drop test set up for unbent bendable elements.
Figure 12:
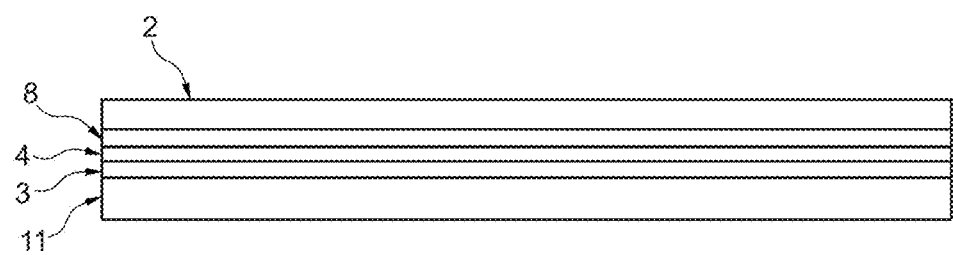

FIG. 12 shows the pen drop set up for unbent bendable elements. A bendable element includes a non-polymer layer 2 and a polymer layer 4. The polymer layer 4 is indirectly attached to the non-polymer layer 2 by intermediate layers, namely an additional adhesive layer in the form of OCA layer 8. The polymer layer 4 is attached to a steel plate 11, resembling a display element for the pen drop test. A ball-point pen drop is performed. To simplify the results, a 0.5 mm thick steel plate 11 is used to simulate the display element. The weight of the ball-point pen is around 5 g. The ball of the pen 12 made of tungsten carbide has a radius of 0.35 mm. The pen drop starts from a height of 10 mm. The height is increased until the bendable element breaks. The greatest height at which the bendable element does not break after pen drop is the pen drop height. 30 pieces of the bendable element are tested and the average pen drop height is recorded.

Figure 13:
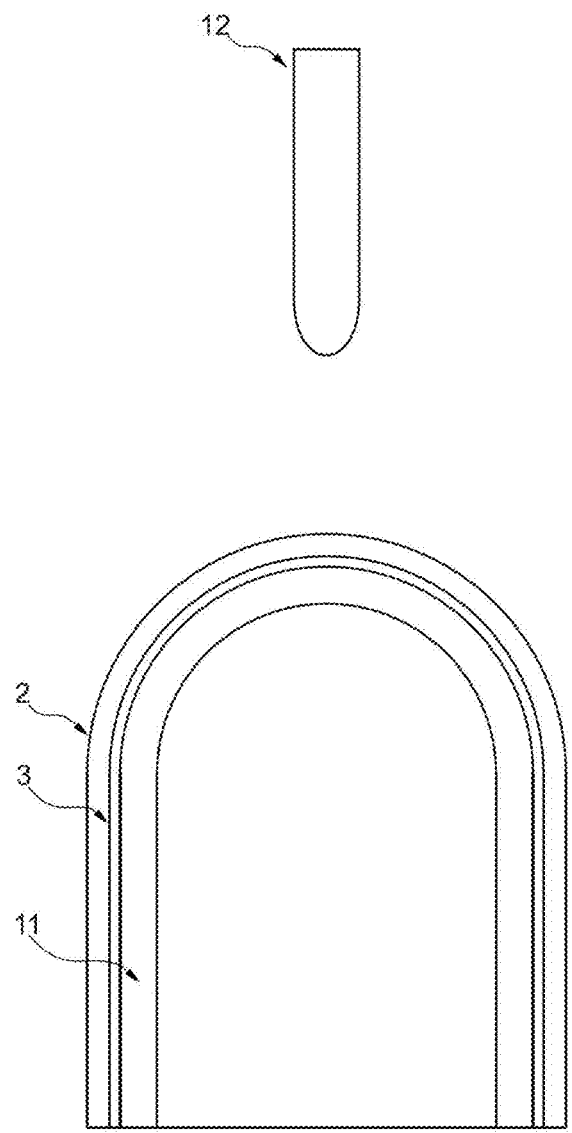
FIG. 13 is a schematic of the pen drop test set up for bent bendable elements.

FIG. 13 shows the pen drop set up for bent elements. A bendable element includes a non-polymer layer 2 and an OCA layer 3. The OCA layer 3 is fixed to the non-polymer layer 2. The OCA layer 3 is attached to a steel plate 11. A ball-point pen drop is performed. To simplify the results, a 0.5 mm thick steel plate 11 is used to simulate a display element. The weight of the ball-point pen is around 5 g. The ball of the pen 12 made of tungsten carbide has a radius of 0.35 mm. The bending radius is 4 mm. The pen drop starts from a height of 5 mm. The height is increased until the bendable element breaks. The greatest height at which the non-polymer layer 2 does not break after pen drop is the pen drop height. 30 pieces of the bendable element are tested and the average pen drop height is recorded.

EXAMPLES

1. Glass Articles

Table 1 shows the compositions of glass articles obtainable by direct hot-forming or chemical slimming. The glasses can be chemically toughened.

TABLE 1

| Composition (wt %) | Type 1 | Type 2 | Type 3 |
|---|---|---|---|
| $SiO_2$ | 61 | 62 | 68.3 |
| $Al_2O_3$ | 17 | 18 | 4.8 |
| $Li_2O$ | — | 5 | — |
| $Na_2O$ | 12 | 9.4 | 15.8 |
| $K_2O$ | 4 | 0.1 | — |
| MgO | 4 | — | 9.0 |
| CaO | — | 0.7 | 1.6 |
| $ZrO_2$ | 2 | 3.6 | — |
| $B_2O_3$ | — | 0.7 | — |
| Others | | 0.5 | 0.5 |

Glass articles of the different glass types were produced in a down draw process or chemical slimming process. The glass articles had very low thicknesses ranging from 30 µm to 100 µm. The articles were chemically toughened to form chemically toughened glass articles.

Each glass article has two major surfaces. In these embodiments, each sample represents a glass article toughened on both sides, generating a compressive stress region with a certain depth (DoL) on each side of the glass article.

2. Polymer Layers

Polymer layers were prepared. Each layer measured about 40 mm×100 mm. The polymers were polyimide (PI) and polyethylene terephthalate (PET). Each polymer was prepared in thicknesses of 30 µm, 50 µm, 80 µm and 100 µm layer thickness. Some of the layers were covered with a hard coating of 10 µm thickness. A deformation test was performed on the specimen.

The used PI had a creep resistance of about 0.8, and the used PET had a creep resistance of about 0.75.

The used PI had a tan δ of about 0.04, as measured by DMA according to ISO 6721-6:2019, determined at a temperature of 25° C. The used PET had a tan δ of about 0.03, as measured by DMA according to ISO 6721-6:2019, determined at a temperature of 25° C.

The creep modulus of the polymers has been determined at 25° C. and 30% relative humidity, at an initial tension of 10, 20 and 40 MPa.

The test samples were prepared as follows: The films were bent to 180° between two parallel Bakelite plates with distances of 15 mm, 10 mm and 8 mm, and held for a duration of 1 day at 25° C. and a humidity of 30%. Then, the films were taken out, put on a polished steel plate and the deformation at the bending region was checked with a CCD camera. The deformation distance was recorded over time.

TABLE 2

| Thickness/μm | Distance of the two plates | PET 30 | PET 50 | PET 80 | PET 100 | PI 30 | PI 50 | PI 80 | PI 100 |
|---|---|---|---|---|---|---|---|---|---|
| initial deformation distance/mm | D = 15 mm | 4.8 | 2.5 | 2.1 | 1.8 | 10.2 | 7.4 | 5.2 | 4.1 |
| | D = 10 mm | 8.4 | 6.9 | 6.3 | 6.0 | 14.2 | 12.1 | 10.1 | 9.5 |
| | D = 8 mm | 10.3 | 8.6 | 7.5 | 7.1 | 16.7 | 14.6 | 13.7 | 12.4 |

TABLE 3

| Thickness/μm | Distance of the two plates | PET + HC 30 + 10 | PET + HC 50 + 10 | PET + HC 80 + 10 | PET + HC 100 + 10 | PI + HC 30 + 10 | PI + HC 50 + 10 | PI + HC 80 + 10 | PI + HC 100 + 10 |
|---|---|---|---|---|---|---|---|---|---|
| initial deformation distance/mm | D = 15 mm | 8.7 | 6.5 | 5.1 | 4.0 | 37.2 | 30.7 | 21.0 | 16.6 |
| | D = 10 mm | 14.2 | 12.8 | 11.0 | 9.5 | 43.1 | 35.4 | 26.7 | 20.4 |
| | D = 8 mm | 16.9 | 15.7 | 14.3 | 12.9 | 46.7 | 37.8 | 30.1 | 23.6 |

3. Glass and Polymer Stack Assemblies

Laminates of alumosilicate glass and polymer were examined. Table 4 shows the layers of the laminates and summarizes their behavior after bending for 480 h at 85° C./85% between plates of 10.5 mm distance.

TABLE 4

| | A | B | C |
|---|---|---|---|
| 5th layer | | 50 μm PI | 50 μm PI |
| 4th layer | | 50 μm OCA | 25 μm OCA |
| 3rd layer | 75 μm glass | 75 μm glass | 75 μm glass |
| 2nd layer | 50 μm OCA | 50 μm OCA | 50 μm OCA |
| 1st layer | 100 μm PET | 100 μm PET | 100 μm PET |
| total thickness | 225 μm | 325 μm | 300 μm |
| initial deformation distance | 48 mm | 47 mm | 46 mm |
| deformation distance after 168 h relaxation | 34 mm | 40 mm | 42 mm |

4. Bendable Element Comprising Glass Layer Type 1

Glass type 1 was prepared in small thicknesses of 30 μm, 50 μm, 70 μm and 100 μm by a slot down draw method and cut to 150 mm×100 mm sheets. All the sheets were immersed into pure $KNO_3$ for ion exchanging. CS and DoL of the glass dies were measured with FSM 6000.

The glass sheets were placed between the parallel Bakelite plates as described above. For the deformation, test samples of glass articles are prepared as follows: five cut and toughened glass articles were placed between two parallel Bakelite plate with a distance of 15 mm, 10 mm and 8 mm. Then, the sheets were held at 25° C. with a humidity of 30% for 1 day. Afterwards, the glass sheets were released and checked for deformation at the bending part with a CCD camera. The deformation distance was recorded via time. The initial deformation distance was recorded via CCD camera, and the deformation recovery time $b_1$ and total persistent deformation $a_0$ were calculated via formula (2).

Figure 6A:
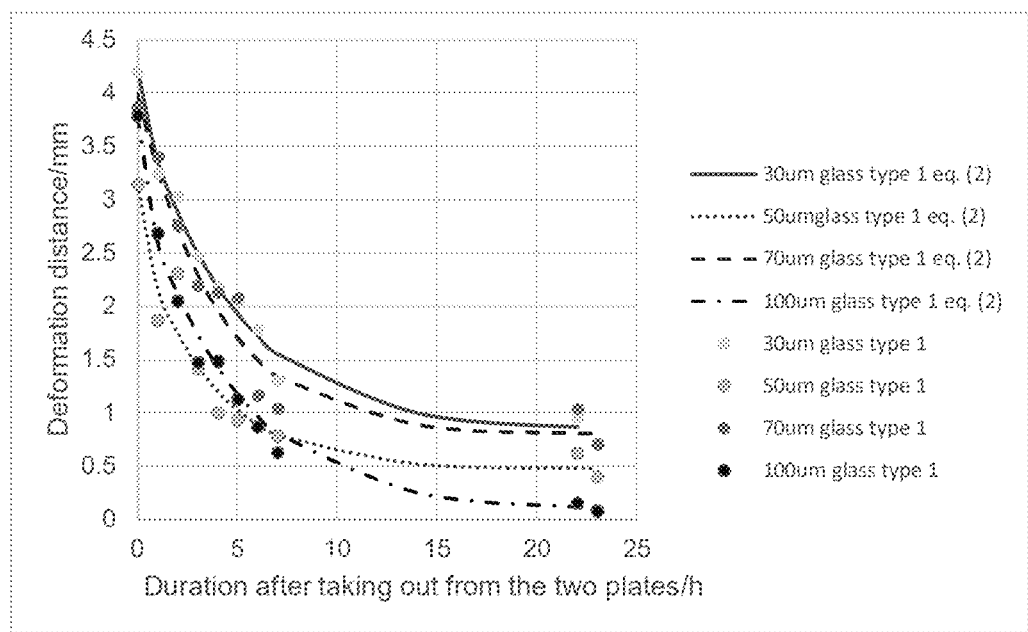
FIG. 6A is a plot showing the dependence of the deformation distance on time after releasing glass layers of various thicknesses from a bent state with 15 mm plate distance after 1 day at 25° C./30% relative humidity.
Figure 6B:
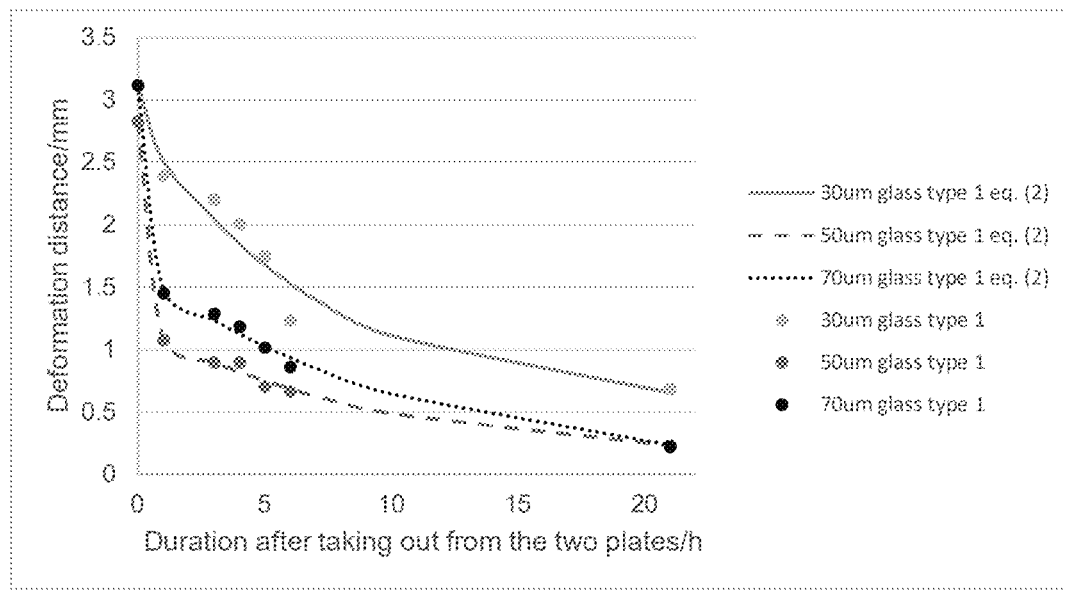
FIG. 6B is a plot showing the dependence of the deformation distance on time after releasing glass layers of various thicknesses from a bent state with 10 mm plate distance after 1 day at 25° C./30% relative humidity.
Figure 6C:
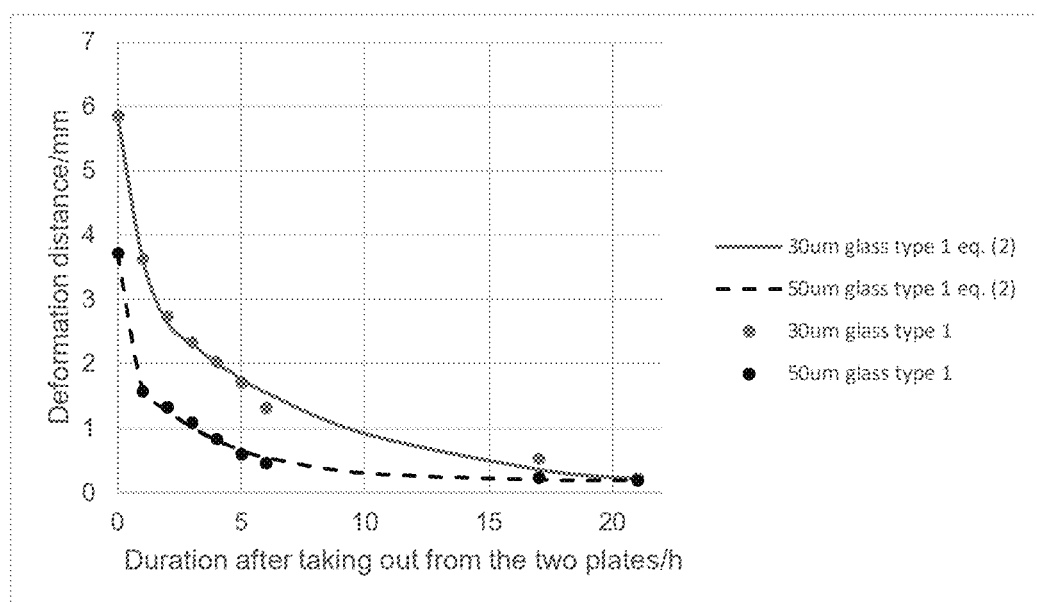
FIG. 6C is a plot showing the dependence of the deformation distance on time after releasing glass layers of various thicknesses from a bent state with 8 mm plate distance after 1 day at 25° C./30% relative humidity.

The results are shown in FIGS. 6A to C. Table 5 summarizes the values.

TABLE 5

| | 30 μm Glass type 1 (CS = 643 MPa, DoL = 6.1 μm) | | 50 μm Glass type 1 (CS = 681 MPa, DoL = 10.4 μm) | | 70 μm Glass type 1 (CS = 735 MPa, DoL = 13.7 μm) | | 100 μm Glass type 1 (CS = 763 MPa, DoL = 17.7 μm) | |
|---|---|---|---|---|---|---|---|---|
| | $a_0$/mm | $b_1$/h | $a_0$/mm | $b_1$/h | $a_0$/mm | $b_1$/h | $a_0$/mm | $b_1$/h |
| D = 15 mm | 0.83 | 4.77 | 0.47 | 3.58 | 0.79 | 3.98 | 0.08 | 4.82 |
| D = 10 mm | 0.53 | 7.35 | 0.12 | 9.30 | 0.01 | 10.53 | — | — |
| D = 8 mm | 0.01 | 5.63 | 0.18 | 3.59 | — | — | — | — |

5. Bendable Element Comprising Coated Glass Layer Type 1

Glass type 1 was drawn to a thickness of 50 μm using a slot down draw method. The glass was cut to sheets of size 150 mm×100 mm. All the glass sheets were immersed into pure $KNO_3$ for ion-exchanging. CS and DoL of the glass sheets were measured with FSM 6000.

A first set of elements was single-coated with a 20 μm thick acrylic-based resin hard coating (HC), which structure is referred to as "glass+HC". The coated elements were placed between parallel Bakelite plates with the hard coating bent inwards as described above.

A second set of elements was single-coated with a 40 μm thick colorless polyamide (CPI) layer, which structure is referred to as "glass+CPI". The coated elements were placed between parallel Bakelite plates with the surface of PI bent inwards as described above.

A third set of elements was coated with a 40 μm thick colorless polyamide (CPI) and then coated with a 10 μm thick acrylic-based resin hard coating (HC), which structure is referred to as "glass+CPI+HC". The coated elements were placed between parallel Bakelite plates with the hard coating bent inwards as described above.

For the deformation test, samples of elements were prepared as follows: five elements were placed between two parallel Bakelite plates at a distance of 15 mm and held at 25° C. with a humidity of 30% for 1 day. Then, the elements were released and the deformation at the bending region was evaluated with a CCD camera. The deformation distance was recorded over time. The initial deformation distance was recorded with a CCD camera, and the deformation recovery time $b_1$ and total persistent deformation $a_0$ were calculated using formula (2).

Figure 7:
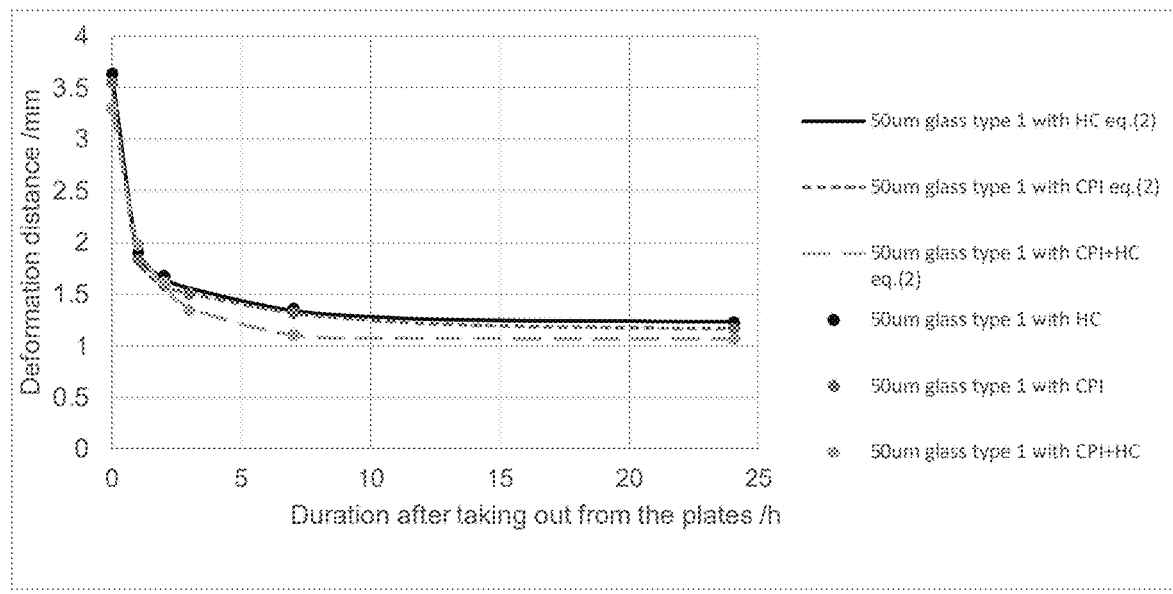
FIG. 7 is a plot showing the dependence of the deformation distance on time after releasing various multi-layered bendable elements from a bent state with 15 mm plate distance after 1 day at 25° C./30% relative humidity.

The results are shown in FIG. 7. Table 6 summarizes the values.

TABLE 6

| | 50 μm Glass type 1 with 20 μm HC (CS = 681 MPa, DoL = 10.4 μm) | | 50 μm Glass type 1 with 40 μm CPI (CS = 681 MPa, DoL = 10.4 μm) | | 50 μm Glass type 1 with 40 μm CPI and 10 μm HC (CS = 681 MPa, DoL = 10.4 μm) | |
|---|---|---|---|---|---|---|
| | $a_0$/mm | $b_1$/h | $a_0$/mm | $b_1$/h | $a_0$/mm | $b_1$/h |
| D = 15 mm | 1.24 | 3.62 | 1.17 | 4.97 | 1.07 | 1.79 |

6. Bendable Element Comprising Glass Layer Type 1 and Polymer Layer (Outwards)

Glass type 1 was drawn to a thickness of 70 μm by a slot down draw method. The sheets were cut to a size of 150 mm×100 mm. All the sheets were immersed into pure $KNO_3$ for ion-exchanging. CS and DoL of the glass sheets were measured with FSM 6000.

Two laminates were prepared by using PET and CPI (manufactured by Kolon). The first laminate was the glass sheet laminated with 25 μm PSA and 50 μm PET. The PSA is Flexcon® classic plus 20092, which has an adhesive force around 4.0 N/cm. The first laminate was placed between the parallel Bakelite plates with the surface of PET bent outwards as described above.

The second laminate was the glass sheet laminated with 25 μm PSA and 50 μm CPI. The PSA was the same as that used for the first laminate. The second laminate was placed between parallel Bakelite plates with the surface of CPI bent outwards as described above.

For the deformation test, samples of the elements were prepared as follows: five cut and toughened elements were placed between two parallel Bakelite plates with a distance of 15 mm and held for 1 day at 25° C. with a humidity of 30%. Then, the elements were taken out and the deformation at the bending region was evaluated with a CCD camera. The deformation distance was recorded via time.

The initial deformation distance was recorded via CCD camera, and the deformation recovery time $b_1$ and total persistent deformation $a_0$ were calculated via formula (2).

It was found that the elements either laminated with PET or CPI had a very high initial deformation distance after releasing from the two parallel Bakelite immediately and then quickly dropped into a small value in 1 h. Therefore, the deformation distance after 1 h were used for simulation by formula (2).

Figure 8:
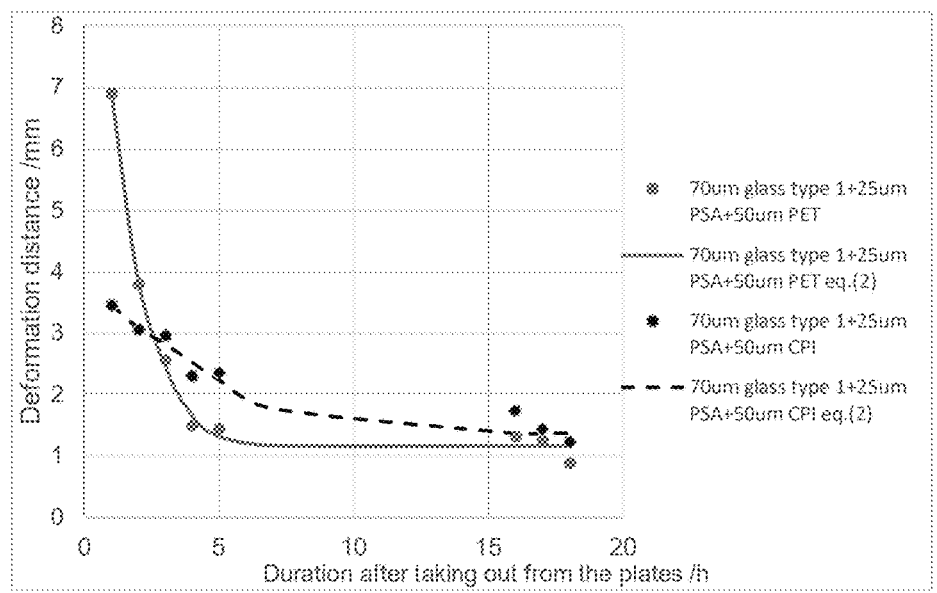
FIG. 8 is a plot showing the dependence of the deformation distance on time after releasing various multi-layered bendable elements from a bent state with 15 mm plate distance after 1 day at 25° C./30% relative humidity.

The results are shown in FIG. 8. Table 7 summarizes the values.

TABLE 7

| | First laminate (CS = 735 MPa, DoL = 13.7 μm) | | Second laminate (CS = 735 MPa, DoL = 13.7 μm) | |
|---|---|---|---|---|
| | $a_0$/mm | $b_1$/h | $a_0$/mm | $b_1$/h |
| D = 15 mm | 1.17 | 0.48 | 1.37 | 0.30 |

7. Bendable Element Comprising Glass Layer Type 1 and Polymer Layer (Inwards)

Glass type 1 was drawn to a thickness of 70 μm by a slot down draw method. The sheets were cut to a size of 150 mm×100 mm. All the sheets were immersed into pure $KNO_3$ for ion-exchanging. CS and DoL of the glass sheets were measured with FSM 6000.

Two laminates were prepared by using PET and CPI. The first laminate was the glass sheet laminated with 25 μm PSA and 50 μm PET. The first laminate was placed between the parallel Bakelite plates with the surface of PET bent inwards as described above.

The second laminate was the glass sheet laminated with 25 μm PSA and 50 μm CPI. The second laminate was placed between parallel Bakelite plates with the surface of CPI bent inwards as described above.

For the deformation test, samples of elements were prepared as follows: five cut and toughened elements were placed between two parallel Bakelite plates with a distance of 15 mm and held for 1 day at 25° C. with a humidity of 30%. Then, the elements were taken out and the deformation at the bending part was evaluated with a CCD camera. The deformation distance was recorded via time.

The initial deformation distance was recorded via CCD camera, and the deformation recovery time $b_1$ and total persistent deformation $a_0$ were calculated via formula (2).

It was found that the elements either laminated with PET or CPI had a very high initial deformation distance after releasing from the two parallel Bakelite immediately and then quickly dropped into a small value in 1 h. Therefore, the deformation distance after 1 h were used for simulation by formula (2).

Figure 9:
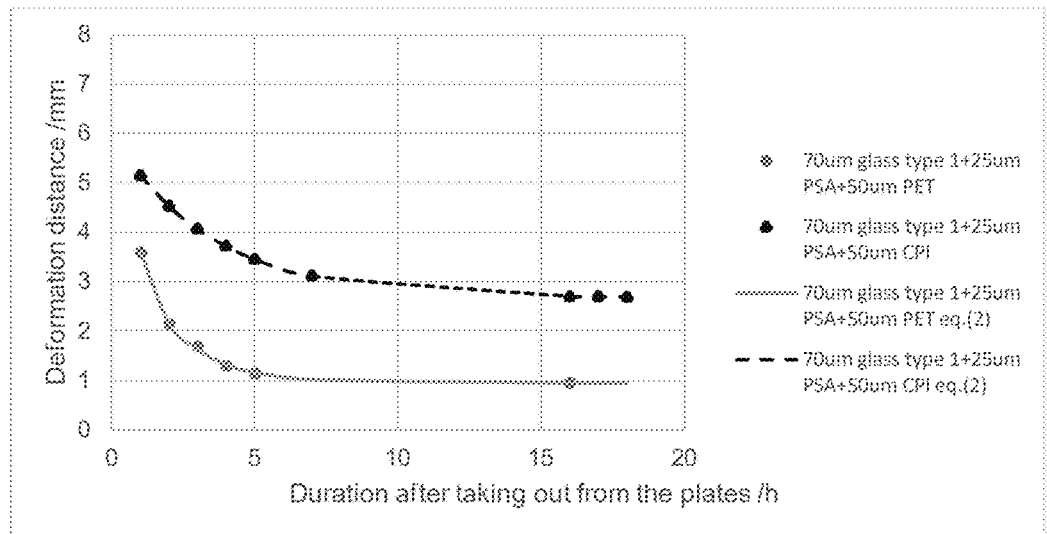
FIG. 9 is a plot showing the dependence of the deformation distance on time after releasing various multi-layered bendable elements from a bent state with 15 mm plate distance after 1 day at 25° C./30% relative humidity.

The results are shown in FIG. 9. Table 8 summarizes the values.

TABLE 8

|  | First laminate (CS = 735 MPa, DoL = 13.7 μm) | | Second laminate (CS = 735 MPa, DoL = 13.7 μm) | |
| --- | --- | --- | --- | --- |
|  | $a_0$/mm | $b_1$/h | $a_0$/mm | $b_1$/h |
| D = 15 mm | 0.95 | 1.73 | 2.67 | 3.48 |

8. Bendable Element Comprising Glass Layer Type 3 and Polymer Layers

Glass articles of glass type 3 cut to sheets of 150 mm×100 mm and slimmed down to a thickness of 33 μm. All the sheets were immersed into pure $KNO_3$ for ion-exchanging. CS and DoL of the glass sheets were measured with FSM 6000.

A first set of elements was double-coated on both primary surfaces with 10 μm thick acrylic-based resin hard coatings (HC), which structure is referred to as "HC+glass+HC". The coated elements were placed between parallel Bakelite plates and bent as described above.

A second set of elements was double-coated on both primary surfaces with 20 μm thick polyimide (PI) coatings, which structure is referred to as "PI+glass+PI". The coated elements were placed between parallel Bakelite plates and bent as described above.

A third set of elements was double-coated on both primary surfaces with 20 μm thick polyamide (PI) coatings and then double-coated with 10 μm thick acrylic-based resin hard coatings (HC). The structure is referred to as "HC+PI+glass+PI+HC". The coated elements were placed between parallel Bakelite plates and bent as described above.

For the deformation test, samples of elements were prepared as follows: five cut and toughened elements were placed between two parallel Bakelite plates with a distance of 4 mm and held at 85° C. with a humidity of 85% for 10 days. Then, the elements were taken out and the deformation at the bending region was evaluated with a CCD camera. The deformation distance was recorded via time. The initial deformation distance was recorded via CCD camera, and the deformation recovery time $b_1$ and total persistent deformation $a_0$ were calculated via formula (2).

Figure 10:
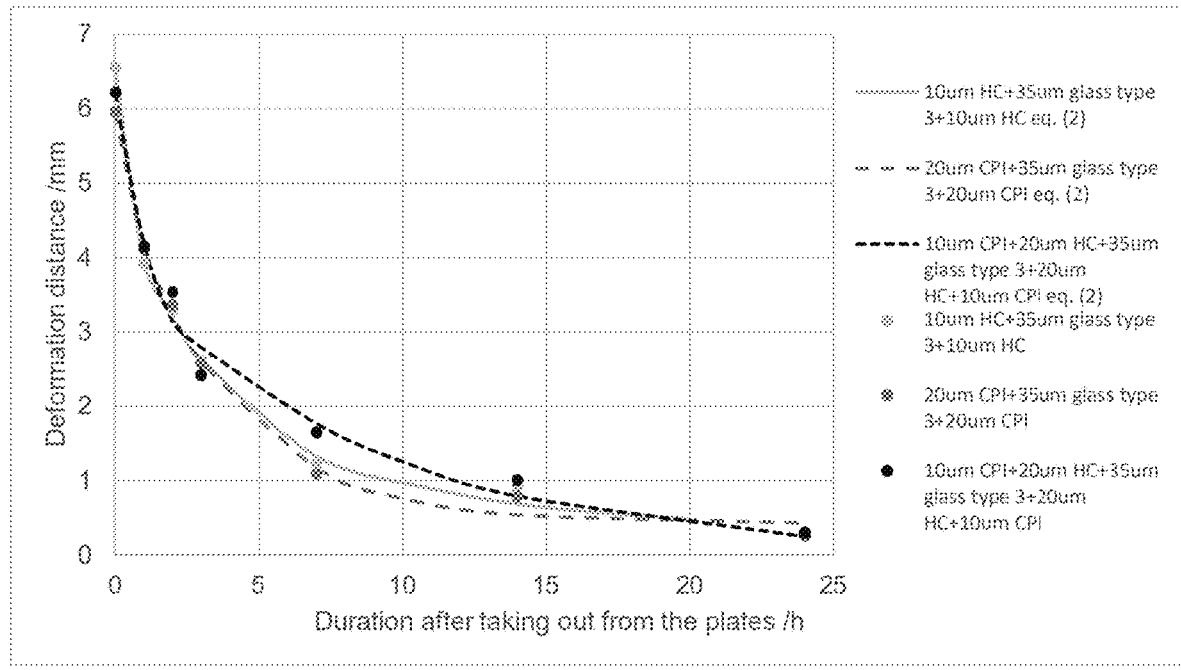
FIG. 10 is a plot showing the dependence of the deformation distance on time after releasing various multi-layered bendable elements from a bent state with 15 mm plate distance after 1 day at 25° C./30% relative humidity.

The results are shown in FIG. 10. Table 9 summarizes the values.

TABLE 9

|  | First set of elements (CS = 538 MPa, DoL = 6.1 μm) | | Second set of elements (CS = 538 MPa, DoL = 6.1 μm) | | Third set of elements (CS = 538 MPa, DoL = 6.1 μm) | |
| --- | --- | --- | --- | --- | --- | --- |
|  | $a_0$/mm | $b_1$/h | $a_0$/mm | $b_1$/h | $a_0$/mm | $b_1$/h |
| D = 4 mm | 0.47 | 4.29 | 0.43 | 3.75 | 1.58 | 8.74 |

9. Bendable Element Comprising Glass Layer Type 1, OCA, and Polymer Layer Laminate (Outwards)

Glass type 1 was drawn to a thickness of 70 μm by a slot down draw method. The sheets were cut to a size of 150 mm×100 mm. All the sheets were immersed into pure $KNO_3$ for ion-exchanging. CS and DoL of the glass sheets were measured with FSM 6000.

A laminate was prepared by using colorless PI (CPI). The first laminate was the glass sheet laminated with 25 μm PSA and 50 μm colorless PI with 10 μm hard coating. The PSA is Flexcon® classic plus 20092, which has an adhesive force around 4.0 N/cm. The first laminate was placed between the parallel Bakelite plates with the surface of CPI bent outwards as described above. For the deformation test, samples of bendable elements were prepared as follows: five cut and toughened elements were placed between two parallel Bakelite plates with a distance of 10 mm and held for 1 day at 25° C. with a humidity of 30%. Then, the sheets were taken out and the deformation at the bending part was evaluated with a CCD camera. The deformation distance was recorded via time.

Figure 11:
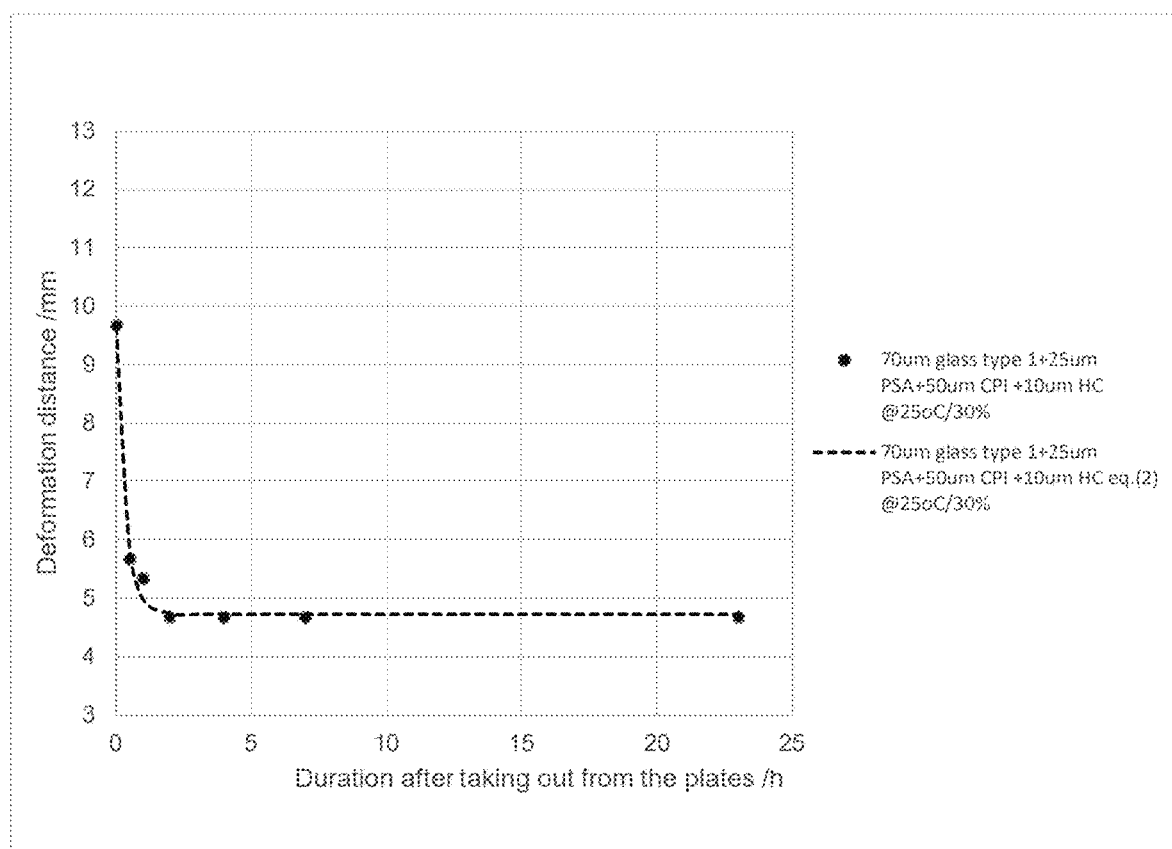
FIG. 11 is a plot showing the dependence of the deformation distance on time after releasing various multi-layered bendable elements from a bent state with 15 mm plate distance after 1 day at 25° C./30% relative humidity.

The initial deformation distance was recorded via CCD camera, and the deformation recovery time $b_1$ and total persistent deformation $a_0$ were calculated via formula (2). The results are shown in FIG. 11. Table 10 summarizes the values.

TABLE 10

|  | Laminate @ 25° C./30% (CS = 735 MPa, DoL = 13.7 μm) | |
| --- | --- | --- |
|  | $a_0$/mm | $b_1$/h |
| D = 10 mm | 2.26 | 0.33 |

While the present disclosure has been described with reference to one or more exemplary embodiments, it will be understood by those skilled in the art that various changes may be made and equivalents may be substituted for elements thereof without departing from the scope of the present disclosure. In addition, many modifications can be made to adapt a particular situation or material to the teachings of the disclosure without departing from the scope thereof. Therefore, it is intended that the present disclosure is not limited to the particular embodiment(s) disclosed as the best mode contemplated, but that the disclosure will include all embodiments falling within the scope of the appended claims.

The invention claimed is:

1. A bendable element, the element comprising:
    a thickness between a first primary surface and a second primary surface of the element;
    a length of the element;
    a width of the element;
    at least one bendable glass layer between the first and second primary surfaces,
    wherein the at least one bendable glass layer has a warp of not more than 2.0 mm;
    one or more bendable polymer layers,
    wherein at least one of the one or more bendable polymer layers has a thickness of 10.0 μm or more;
    a total polymer thickness PT of the element that ranges from 20.0 μm to 600 μm,
    wherein the total polymer thickness is a sum of the thicknesses of the one or more bendable polymer layers;
    a total non-polymer thickness NPT of the element that ranges from 20.0 μm to less than 100 μm,
    wherein the total non-polymer thickness is the sum of the thicknesses of any non-polymer layers in the element; and
    a thickness ratio PT/NPT of the element that ranges from >0.0 to <5.0, wherein the one or more polymer layers are attached to the at least one bendable glass layer by one or more adhesive layers,
wherein the element can be bent to a bending radius of 5.0 mm without failure, and
wherein the element has reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity.

2. The bendable element according to claim 1, wherein the thickness between the first primary surface and the second primary surface of the element is less than 800 μm.

3. The bendable element according to claim 1, wherein
$a_0$ is less than or equal to 2.0 mm, and/or
$b_1$ is less than 5 hours.

4. The bendable element according to claim 1,
wherein the length is at least 0.5 cm and/or the width is at least 0.4 cm, and
wherein the length is greater than the width.

5. The bendable element according to claim 1, further comprising at least one further polymer or a non-polymer layer between the first and second primary surfaces,
wherein at least one of the following conditions applies:
PT ranges from 40.0 μm to 200 μm,
NPT ranges from 25.0 μm to 80 μm, and
PT/NPT ranges from >0.0 to <3.0.

6. The bendable element according to claim 1,
wherein the at least one bendable glass layer further comprises:
a thickness between the first primary surface and the second primary surface of the element that is from 20.0 μm to 80 μm;
a total thickness variation TTV of not more than 10 μm;
a surface roughness $R_a$ of not more than 5.0 nm;
a two-point bending strength of at least 700 MPa;
a compressive stress of at least 100 MPa in one or both of the primary surfaces; and/or
a DoL of at least 1.0 μm and up to 30.0 μm.

7. The bendable element according to claim 6, wherein the glass of the at least one bendable glass layer further has at least one of the following properties:
a Young's modulus of more than 50 GPa;
a fracture toughness $K_{IC}$ of not more than 4.0 MPam$^{1/2}$;
a Poisson's ratio of less than 0.28;
a Knoop hardness of at least 450 MPa;
a fragility of at least 18 and/or less than 42; and
a shear modulus of more than 23.5 GPa.

8. The bendable element according to claim 1, wherein the at least one bendable glass layer has a pen drop breakage height of at least 20.0 mm.

9. The bendable element according to claim 1, further comprising one or more coating layers on at least one of the first and second primary surfaces.

10. The bendable element according to claim 1, wherein at least one of the one or more bendable polymer layers has a thickness of 20 μm or more.

11. The bendable element according to claim 10, wherein the at least one of the one or more bendable polymer layers has a persistent deformation factor of not more than 1.5, wherein the persistent deformation factor is the creep resistance plus tan δ of a polymer material of the one or more bendable polymer layers.

12. The bendable element according to claim 6, wherein the at least one bendable glass layer is made of a glass having the following composition in weight percent:
$SiO_2$ 45.0 to 75.0%;
$Al_2O_3$ 2.5 to 25.0%;
$Li_2O$ 0.0 to 10.0%;
$Na_2O$ 5.0 to 20.0%;
$K_2O$ 0.0 to 10.0%;
MgO 0.0 to 15.0%;
CaO 0.0 to 10.0%;
$P_2O_5$ 0.0 to 20.0%;
BaO 0.0 to 5.0%;
ZnO 0.0 to 5.0%;
$ZrO_2$ 0.0 to 5.0%;
$B_2O_3$ 0.0 to 5.0%; and
$TiO_2$ 0.0 to 2.5%.

13. The bendable element according to claim 1, wherein the bendable element has an initial deformation distance at a 10 mm bend radius of not more than 40 mm, wherein the initial deformation distance is the height of the deformation distance measured immediately after releasing the bendable element from a 10.0 mm bend radius after 24 hours at 25° C. and 30% relative humidity.

14. The bendable element according to claim 1, wherein the bendable element has a 40 mm-initial deformation threshold of less than 10 mm, wherein the 40 mm-initial deformation threshold is the bending radius to which the bendable element can be bent for 24 hours at 25° C. and 30% relative humidity without exceeding an initial deformation distance of 40 mm immediately after releasing the bendable element from the bend radius.

15. The bendable element according to claim 1,
wherein the at least one bendable glass layer is one bendable glass layer,
wherein the one or more bendable polymer layers comprise two polymer layers disposed on opposite sides of the one bendable glass layer,
wherein the one or more adhesive layers comprise two adhesive layers, each disposed on an opposite sides of the one bendable glass layer between the one bendable glass layer and a respective one of the two polymer layers,
and
wherein the two polymer layers comprise one or more polymers having a creep resistance of at least 0.65.

16. The bendable element according to claim 15,
wherein the two polymer layers have a persistent deformation factor of not more than 1.5, and
wherein the persistent deformation factor is the creep resistance plus tan δ of a polymer material of the two polymer layers.

17. The bendable element according to claim 15,
wherein one or both of the two polymer layers comprise a polymer selected from the group consisting of: polyethylene terephthalate, polyimide, and polycarbonate, and
wherein the selected polymer has a creep resistance of at least 0.75.

18. The bendable element according to claim 15,
wherein one or both of the two polymer layers comprise a polymer selected from the group consisting of: polyethylene terephthalate, polyimide, and polycarbonate, and
wherein the selected polymer has a tan δ of 0.01 to 0.4.

19. An electronic device having a foldable display comprising:
a bendable element according to claim 1, and
at least one hinge allowing the foldable display to be bent about a bending axis, wherein the bendable element has a 40 mm-initial deformation threshold of less than 10 mm, and wherein the electronic device is designed so that the foldable display can be bent to a bending radius of no less than the 40 mm-initial deformation threshold.

20. A bendable element, the element comprising:

a thickness between a first primary surface and a second primary surface of the element;

a length of the element;

a width of the element;

at least one bendable glass layer between the first and second primary surfaces, wherein the at least one bendable glass layer has a DoL from 1.0 μm to 30.0 μm;

one or more bendable polymer layers, wherein at least one of the one or more bendable polymer layers has a thickness of 10.0 μm or more;

a total polymer thickness PT of the element that ranges from 20.0 μm to 600 μm, wherein the total polymer thickness is a sum of the thicknesses of the one or more bendable polymer layers;

a total non-polymer thickness NPT of the element that ranges from 20.0 μm to less than 100 μm, wherein the total non-polymer thickness is the sum of the thicknesses of any non-polymer layers in the element; and a thickness ratio PT/NPT of the element that ranges from >0.0 to <5.0, wherein the one or more polymer layers are attached to the at least one bendable glass layer by one or more adhesive layers, wherein the element can be bent to a bending radius of 5.0 mm without failure, and wherein the element has reduced persistent deformation characterized by a total persistent deformation $a_0$ of not more than 3.0 mm and a deformation recovery time $b_1$ of less than 10 hours after bending the element to a bending radius of 15.0 mm for 24 hours at 25° C. and 30% relative humidity.

* * * * *